United States Patent
Baba

(10) Patent No.: US 9,661,199 B2
(45) Date of Patent: May 23, 2017

(54) IMAGING APPARATUS AND ELECTRONIC DEVICE WHICH CAN BE REDUCED IN HEIGHT

(71) Applicant: SONY CORPORATION, Tokyo (JP)

(72) Inventor: Tomohiko Baba, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/762,744

(22) PCT Filed: Jan. 20, 2014

(86) PCT No.: PCT/JP2014/050899
§ 371 (c)(1),
(2) Date: Jul. 22, 2015

(87) PCT Pub. No.: WO2014/119402
PCT Pub. Date: Aug. 7, 2014

(65) Prior Publication Data
US 2015/0358516 A1    Dec. 10, 2015

(30) Foreign Application Priority Data

Jan. 30, 2013    (JP) ................ 2013-015521

(51) Int. Cl.
*H04N 5/225* (2006.01)
*G02B 13/00* (2006.01)
*G02B 7/02* (2006.01)
*G03B 17/04* (2006.01)

(52) U.S. Cl.
CPC .......... *H04N 5/2253* (2013.01); *G02B 7/021* (2013.01); *G02B 7/023* (2013.01); *G02B 13/002* (2013.01); *G02B 13/004* (2013.01); *G02B 13/0015* (2013.01); *G02B 13/0045* (2013.01); *H04N 5/2254* (2013.01); *G03B 17/04* (2013.01)

(58) Field of Classification Search
CPC .. H04N 5/2253; H04N 5/2254; G02B 13/002; G02B 7/021; G02B 13/0015; G02B 7/023; G02B 13/0045; G02B 13/004; G03B 17/04
See application file for complete search history.

(56) References Cited

U.S. PATENT DOCUMENTS

| | | | | |
|---|---|---|---|---|
| 2012/0217606 A1* | 8/2012 | Itonaga | ............... | H01L 31/0203 257/443 |
| 2013/0063634 A1* | 3/2013 | Yamano | ............. | G02B 13/0035 348/294 |
| 2013/0278714 A1* | 10/2013 | Hirose | ............... | G02B 13/0035 348/36 |

FOREIGN PATENT DOCUMENTS

| | | |
|---|---|---|
| JP | 05-164965 A | 6/1993 |
| JP | 2000-292688 A | 10/2000 |
| JP | 2004-312239 A | 11/2004 |
| JP | 2009-020339 A | 1/2009 |

(Continued)

*Primary Examiner* — Gevell Selby
(74) *Attorney, Agent, or Firm* — Chip Law Group

(57) ABSTRACT

There is provided an imaging apparatus including: a lens group including one or more lens elements; and an image sensor having a light-receiving surface onto which an image of an object is formed by the lens group. The light-receiving surface of the image sensor is curved concavely toward the lens group. A distance from a lens surface closest to the light-receiving surface of the lens group to the light-receiving surface is a half or more of a distance from a lens surface closest to the object of the lens group to the light-receiving surface.

9 Claims, 26 Drawing Sheets

(56) References Cited

FOREIGN PATENT DOCUMENTS

| JP | 2012-230233 | * 11/2012 | ............. G03B 13/00 |
| WO | 2012/173026 A1 | 12/2012 | |

* cited by examiner

IMAGING APPARATUS AND ELECTRONIC DEVICE WHICH CAN BE REDUCED IN HEIGHT

TECHNICAL FIELD

The present technology relates an imaging apparatus and an electronic device, particularly to an imaging apparatus and an electronic device which can be reduced in height.

BACKGROUND ART

There has recently been a strong demand for a miniaturized high-resolution imaging apparatus as an imaging apparatus mounted on a mobile phone or a personal computer (PC). In response to the demand, the cell pitch of an image sensor such as a charged couple device (CCD) or complementary metal oxide semiconductor (CMOS) image sensor has been dramatically reduced, so that an optical system is demanded to provide higher image-forming performance with less optical aberrations than before.

To satisfy the demand, the number of lenses has been increased. For example, there has been proposed a configuration including five aspherical plastic lenses.

However, increasing the number of lenses will reduce productivity since the increased number of lenses necessitate high assembly accuracy and because of the fundamental physical properties, such as minute birefringence, of plastic lenses themselves.

Accordingly, there has been proposed technology to simplify a lens by spherically curving an image sensor to reduce necessity of image plane correction (see Patent Literature 1, for example).

Patent Literature 1 describes a front-diaphragm optical system having a configuration of two lenses in one group, in which separately molded two plastic lenses are bonded together. However the technology in Patent Literature 1 has problems such as the optical system including no infrared cut-off filter, and the curvature of the image sensor causing some optical barrel distortion, and thus has been applicable only to a low-pixel image such as an image in common intermediate format (CIF) or video graphics array (VGA) format.

CITATION LIST

Patent Literature

Patent Literature 1: JP 2004-312239A

SUMMARY OF INVENTION

Technical Problem

Meanwhile, no technology has been proposed to reduce the height of an imaging apparatus that uses an image sensor having high sensitivity and wide dynamic range, and thus being applicable to high-pixel images.

The present technology has been made in view of the above circumstances, and enables more effective device height reduction.

Solution to Problem

According to an embodiment of the present disclosure, there is provided an imaging apparatus including: a lens group including one or more lens elements; and an image sensor having a light-receiving surface onto which an image of an object is formed by the lens group. The light-receiving surface of the image sensor is curved concavely toward the lens group. A distance from a lens surface closest to the light-receiving surface of the lens group to the light-receiving surface is a half or more of a distance from a lens surface closest to the object of the lens group to the light-receiving surface.

The light-receiving surface of the image sensor may have such an aspherical shape that a tangential angle between an external tangent to an edge of the light-receiving surface and a plane perpendicular to an optical axis of the lens group is smaller than the tangential angle of the light-receiving surface having a spherical shape.

An intersection between an optical axis of the lens group and a normal line of an external tangent to the light-receiving surface at 90% image height may be farther from the light-receiving surface than an intersection between the optical axis and a normal line of an external tangent to the light-receiving surface at any of 0 to 70% image heights.

The lens group may generate negative optical distortion or negative TV distortion.

The optical distortion and the TV distortion may be 1% or more.

The lens group may include at least a first lens, a second lens, and a third lens, which are arranged from a side near the object toward the light-receiving surface. A focal length f of the lens group, a focal length fg1 of the first lens, a focal length fg2 of the second lens, and a focal length fg3 of the third lens may satisfy any of the following conditional expressions:

$$1 \leq |fg1/f| \leq 50$$

$$-2 \leq fg2/f \leq 0.5$$

$$0.4 \leq fg3/f \leq 1.$$

A curvature radius Rg1S1 of a lens surface closer to the object of the first lens, and a curvature radius Rg1S2 of a lens surface closer to the light-receiving surface of the first lens may satisfy either of the following conditional expressions:

$$(Rg1S1+Rg1S2)/(Rg1S2-Rg1S1) \leq -3$$

$$(Rg1S1+Rg1S2)/(Rg1S2-Rg1S1) > 10.$$

A thickness Tg1 of the first lens along an optical axis, a thickness Tg2 of the second lens along the optical axis, a thickness Tg3 of the third lens along the optical axis, an air distance D1 along the optical axis between the first and second lenses, and an air distance D2 along the optical axis between the second and third lenses may satisfy the following conditional expression:

$$(Tg1+Tg2+Tg3) > (D1+D2).$$

The lens group may be held by a retractable lens barrel. While the lens barrel protrudes, the distance from the lens surface closest to the light-receiving surface of the lens group to the light-receiving surface may be a half or more of the distance from the lens surface closest to the object of the lens group to the light-receiving surface.

According to an embodiment of the present disclosure, there is provided an electronic device including: an imaging apparatus including a lens group including one or more lens elements, and an image sensor having a light-receiving surface onto which an image of an object is formed by the lens group. The light-receiving surface of the image sensor is curved concavely toward the lens group. A distance from a lens surface closest to the light-receiving surface of the lens group to the light-receiving surface is a half or more of a distance from a lens surface closest to the object of the lens group to the light-receiving surface.

In an aspect of the present technology, the light-receiving surface of the image sensor is curved concavely toward the lens group, and the distance from the lens surface, closest to the light-receiving surface, of the lens group to the light-receiving surface is set to a half or more of the distance from the lens surface, closest to the object, of the lens group to the light-receiving surface.

Advantageous Effects of Invention

The aspect of the present technology enables more effective device height reduction.

DESCRIPTION OF EMBODIMENT

Hereinafter, an embodiment of the present technology will be described with reference to the drawings.

Conventional Example 1

Figure 1:
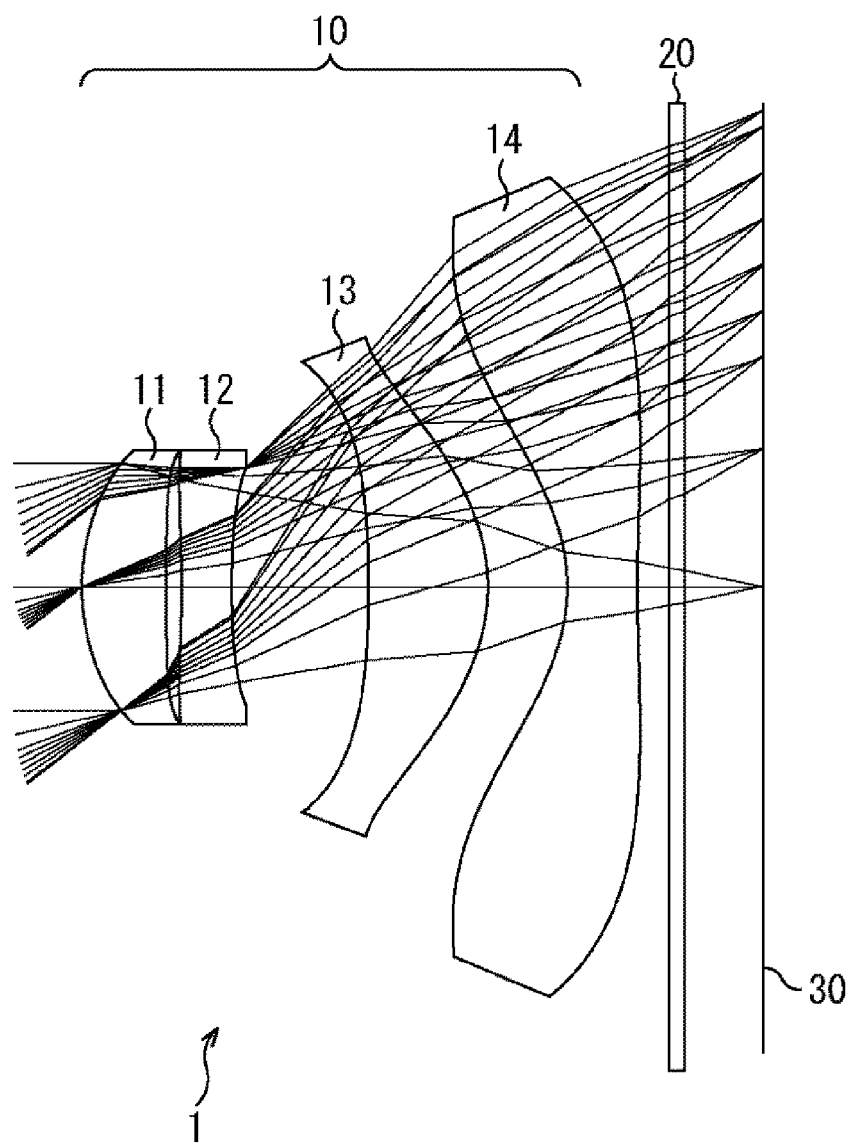
FIG. 1 shows an exemplary configuration of a conventional imaging apparatus.

FIG. 1 shows an exemplary configuration of an imaging apparatus for a 1/3.2 size 8-megapixel CMOS image sensor with a pixel pitch of 1.4 µm. The imaging apparatus 1 shown in FIG. 1, which is mounted on a mobile phone, includes four lenses.

The imaging apparatus 1 in FIG. 1 includes a lens group 10, a cover glass 20 and an image sensor 30. The lens group 10 includes lens elements 11 to 14.

In the imaging apparatus 1 in FIG. 1, the image sensor 30 has a flat light-receiving surface.

Table 1 shows the focal length f, the numerical aperture F, the half angle of view ω and the lens length H of the lens group 10 of the imaging apparatus 1 in FIG. 1. In the example shown in FIG. 1, the focal length f is set to 3.81 mm, the numerical aperture F is set to 2.5, the half angle of view ω is set to 36.2 degrees, the lens length H is set to 4.27 mm, and the back focus BF is set to 0.8 mm Thus, the entire optical length is 4.35 mm.

Figure 2:
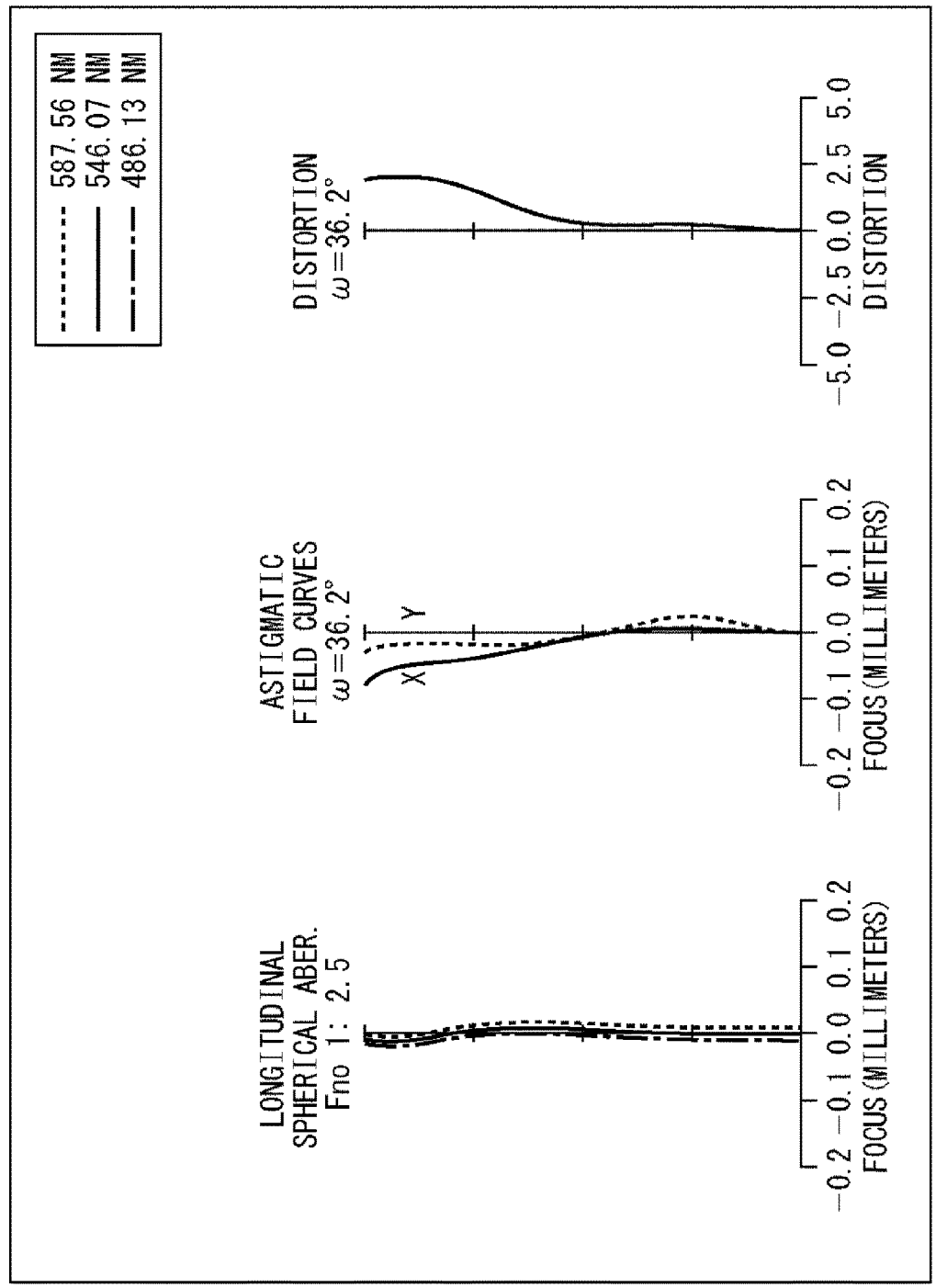
FIG. 2 is an aberration graph showing spherical aberration, astigmatism and distortion in Conventional Example 1.

TABLE 1 f (focal length) = 3.81 mm
F (numerical aperture) = 2.5
ω (half angle of view) = 36.2 deg
H (entire lens length) = 4.27 mm
BF (back focus) = 0.8 mm FIG. 2 is an aberration graph showing spherical aberration (chromatic aberration), astigmatism and distortion in Conventional Example 1. The left part of FIG. 2 shows spherical aberration (chromatic aberration), the middle part of FIG. 2 shows astigmatism, and the right part of FIG. 2 shows distortion. According to Conventional Example 1, the aberrations of spherical aberration, astigmatism and distortion are all corrected, as shown in FIG. 2.

Figure 3:
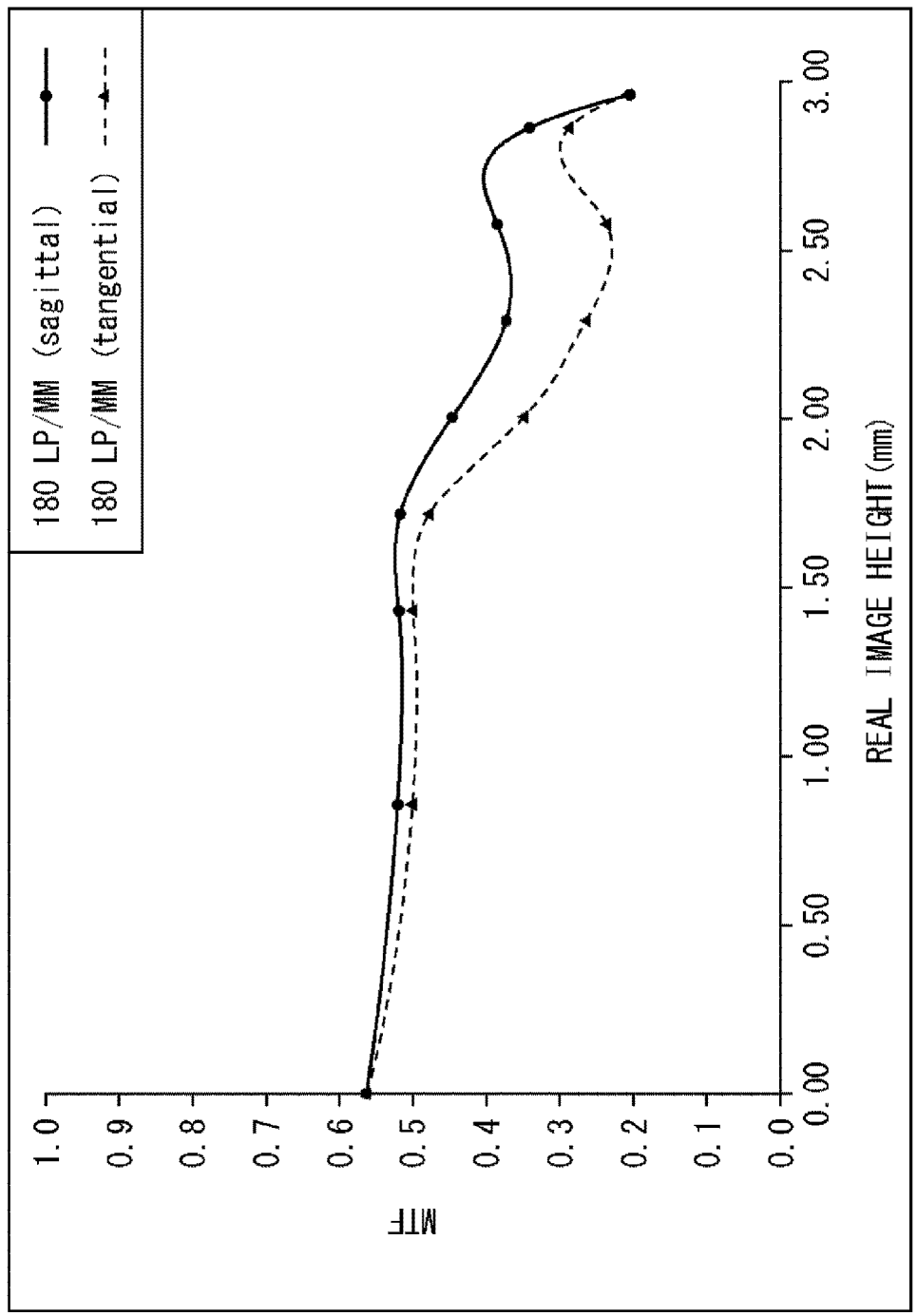
FIG. 3 shows image height dependence of MTF in Conventional Example 1.

FIG. 3 shows image height dependence of the modulation transfer function (MTF) in Conventional Example 1. According to Conventional Example 1, the MTF value at 180 lp/mm is 0.5 or more in approximately half of the region in both the sagittal and tangential directions, as shown in FIG. 3.

Figure 4:
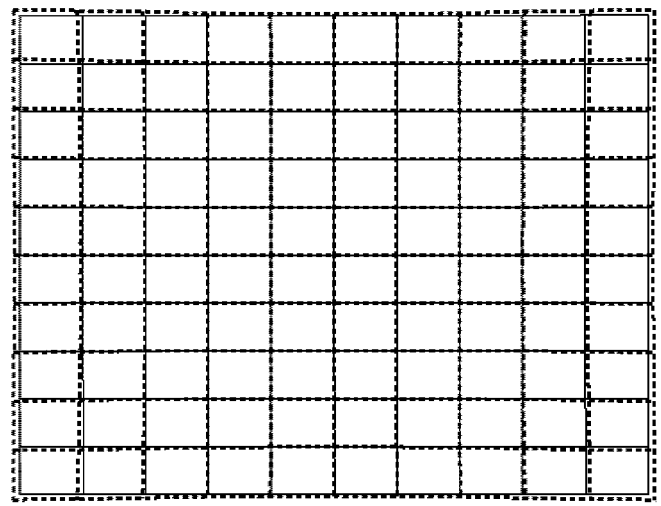
FIG. 4 shows a distortion lattice in Conventional Example 1.

Furthermore, in Conventional Example 1, the optical distortion of the entire imaging apparatus is suppressed to small positive (pincushion) optical distortion, as shown in FIG. 4.

Conventional Example 2

Figure 5:
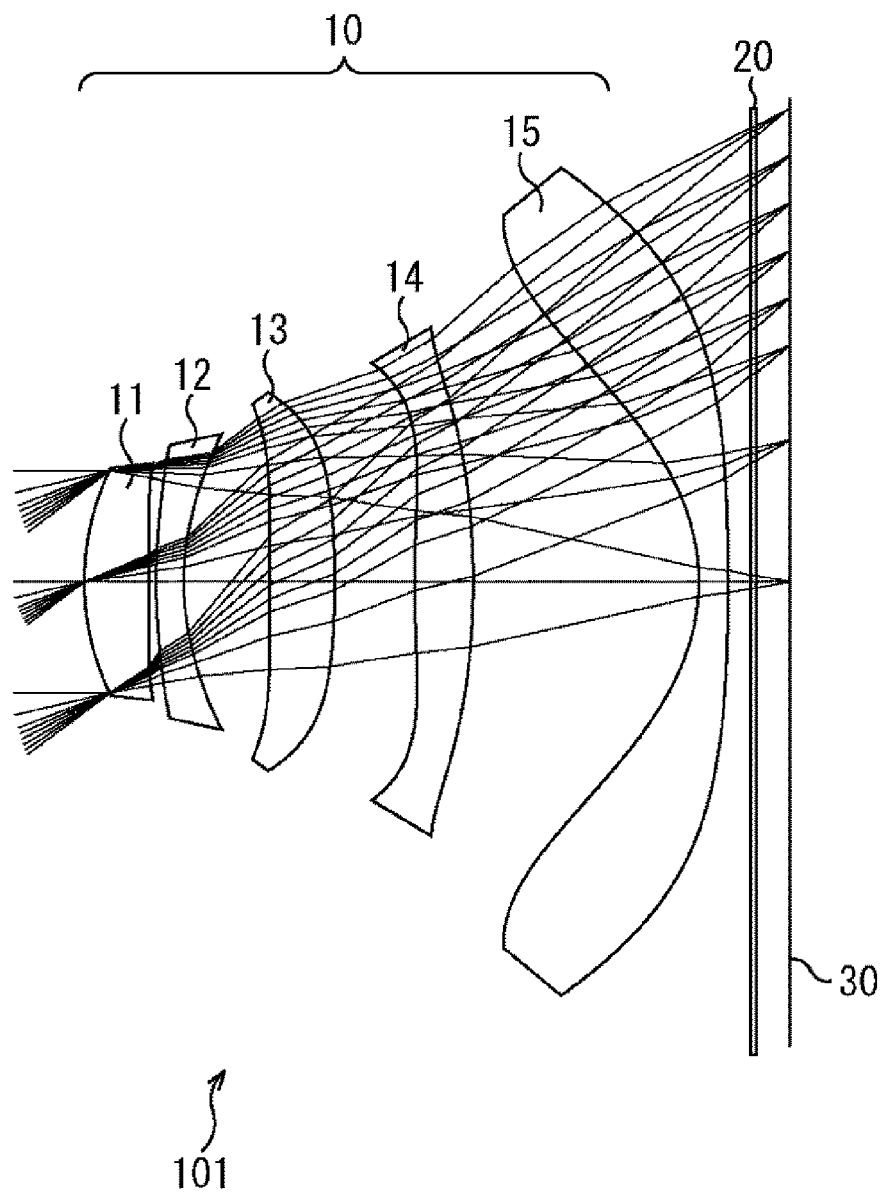
FIG. 5 shows another exemplary configuration of a conventional imaging apparatus.

FIG. 5 shows an exemplary configuration of an imaging apparatus for a 1/1.12 size 40-megapixel CMOS image sensor with a pixel pitch of 1.75 μm. The imaging apparatus 101 shown in FIG. 2, which is mounted on a mobile phone, too, includes five lenses.

The imaging apparatus 101 in FIG. 5 includes a lens group 110, the cover glass 20 and the image sensor 30. The lens group 110 includes lens elements 11 to 15.

In the imaging apparatus 101 in FIG. 5, the image sensor 30 has a flat light-receiving surface.

Table 2 shows the focal length f, the numerical aperture F, the half angle of view ω and the lens length H of the lens group 110 of the imaging apparatus 101 in FIG. 5. In the example shown in FIG. 5, the focal length f is set to 10.3 mm, the numerical aperture F is set to 2.8, the half angle of view ω is set to 36.7 degrees, the lens length H is set to 11.0 mm, and the back focus BF is set to 1.04 mm Thus, the entire optical length is 12.0 mm

TABLE 2

| |
|---|
| f (focal length) = 10.3 mm |
| F (numerical aperture) = 2.8 |
| ω (half angle of view) = 36.7 deg |
| H (entire lens length) = 11.0 mm |
| BF (back focus) = 1.04 mm |

Figure 6:
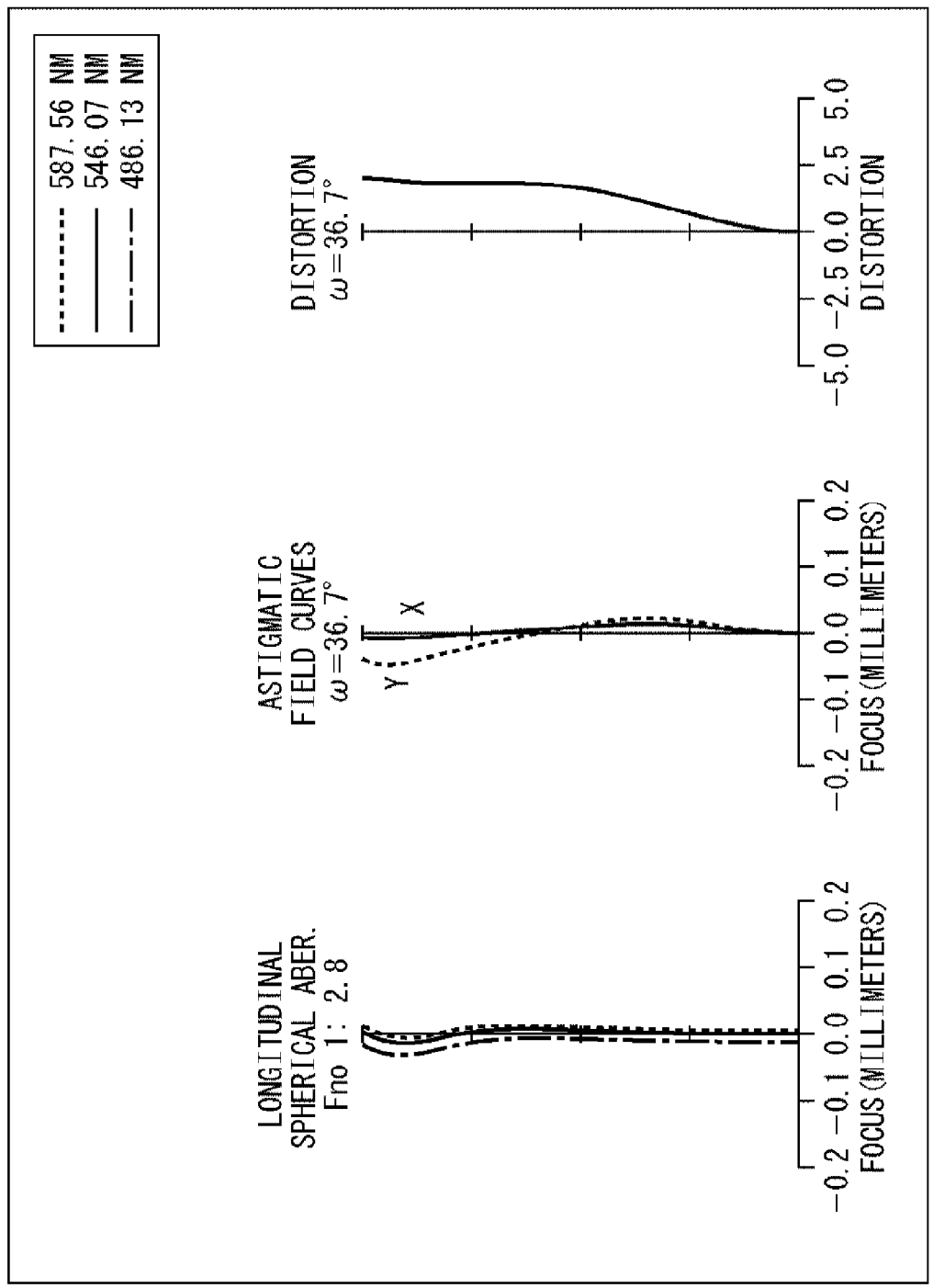
FIG. 6 is an aberration graph showing spherical aberration, astigmatism and distortion in Conventional Example 2.

FIG. 6 is an aberration graph showing spherical aberration (chromatic aberration), astigmatism and distortion in Conventional Example 2. The left part of FIG. 6 shows spherical aberration (chromatic aberration), the middle part of FIG. 6 shows astigmatism, and the right part of FIG. 6 shows distortion. According to Conventional Example 2, the aberrations of spherical aberration, astigmatism and distortion are all corrected, as shown in FIG. 6.

Figure 7:
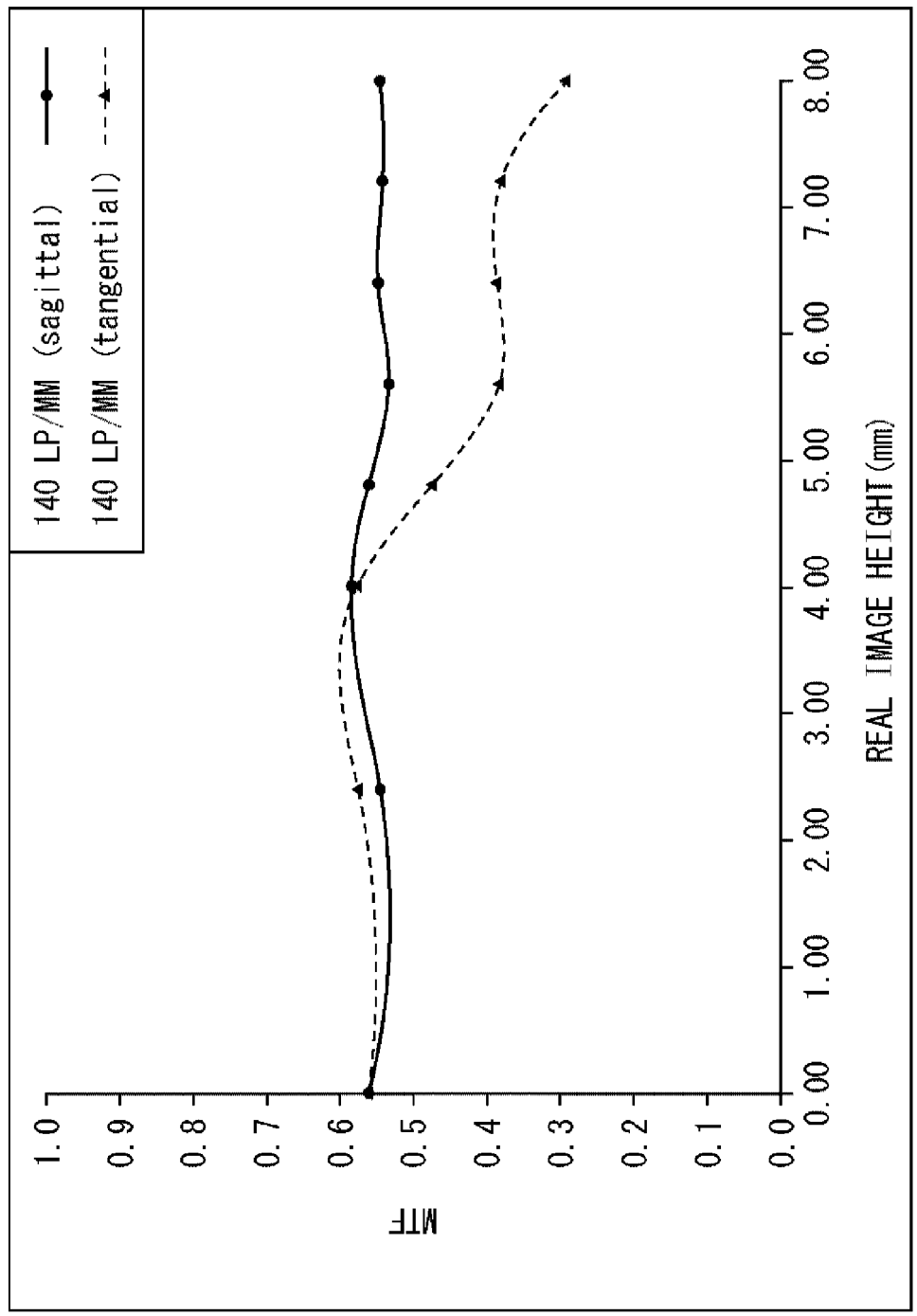
FIG. 7 shows image height dependence of MTF in Conventional Example 2.

FIG. 7 shows image height dependence of MTF in Conventional Example 2. According to Conventional Example 2, the MTF value at 140 lp/mm is 0.5 or more in approximately half of the region in the tangential direction, and in the entire region in the sagittal direction, as shown in FIG. 7.

Figure 8:
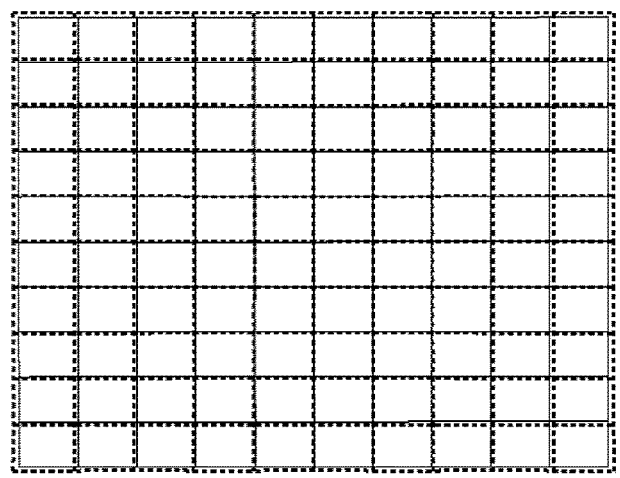
FIG. 8 shows a distortion lattice in Conventional Example 2.

Furthermore, in Conventional Example 2, the optical distortion of the entire imaging apparatus is suppressed to small positive (pincushion) optical distortion, as shown in FIG. 8.

However, in Conventional Examples 1 and 2 described above, the back focus is designed to be minimized to the limit. Accordingly, when the imaging apparatus 1 or the imaging apparatus 101 is mounted on a mobile phone, the lens group is unretractable therein.

Figure 9:
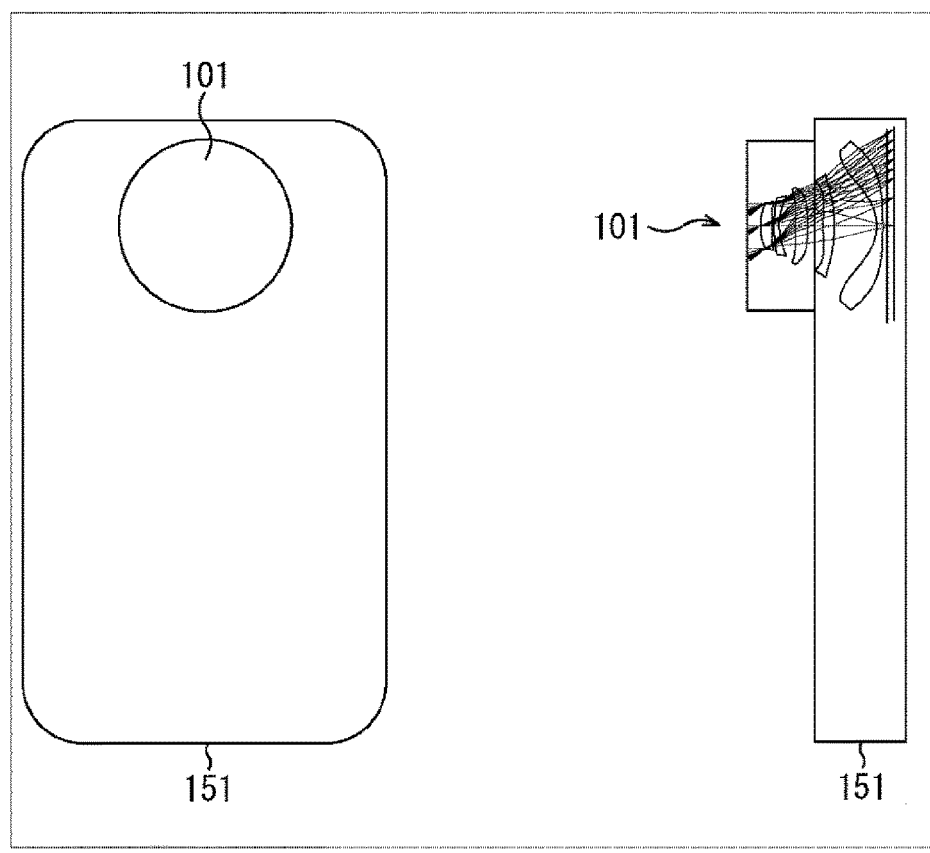
FIG. 9 shows front and side views of an electronic device on which a conventional imaging apparatus is mounted.

For example, when the imaging apparatus 101, whose entire optical length is 12.0 mm, is mounted on a mobile phone 151, as shown in FIG. 9, the lens group 110 is unretractable in the mobile phone 151, which thus has a thickness of approximately 16 mm in a lens portion.

Though not shown, when the imaging apparatus 1, whose entire optical length is 4.35 mm, is mounted on the mobile phone 151, the lens group 10 is unretractable in the mobile phone 151, which thus has a thickness of approximately 8 mm in a lens portion.

As described above, when a conventional imaging apparatus using a relatively high-resolution image sensor is mounted on an electronic device such as a mobile phone, thickness increase in a lens portion thereof could not be suppressed.

Accordingly, in the present technology to be described below, a lens group is made retractable in an imaging apparatus using a high-resolution image sensor so as to suppress the thickness of an electronic device on which the imaging apparatus is mounted.

[Embodiment of the Present Technology]

Figure 10:
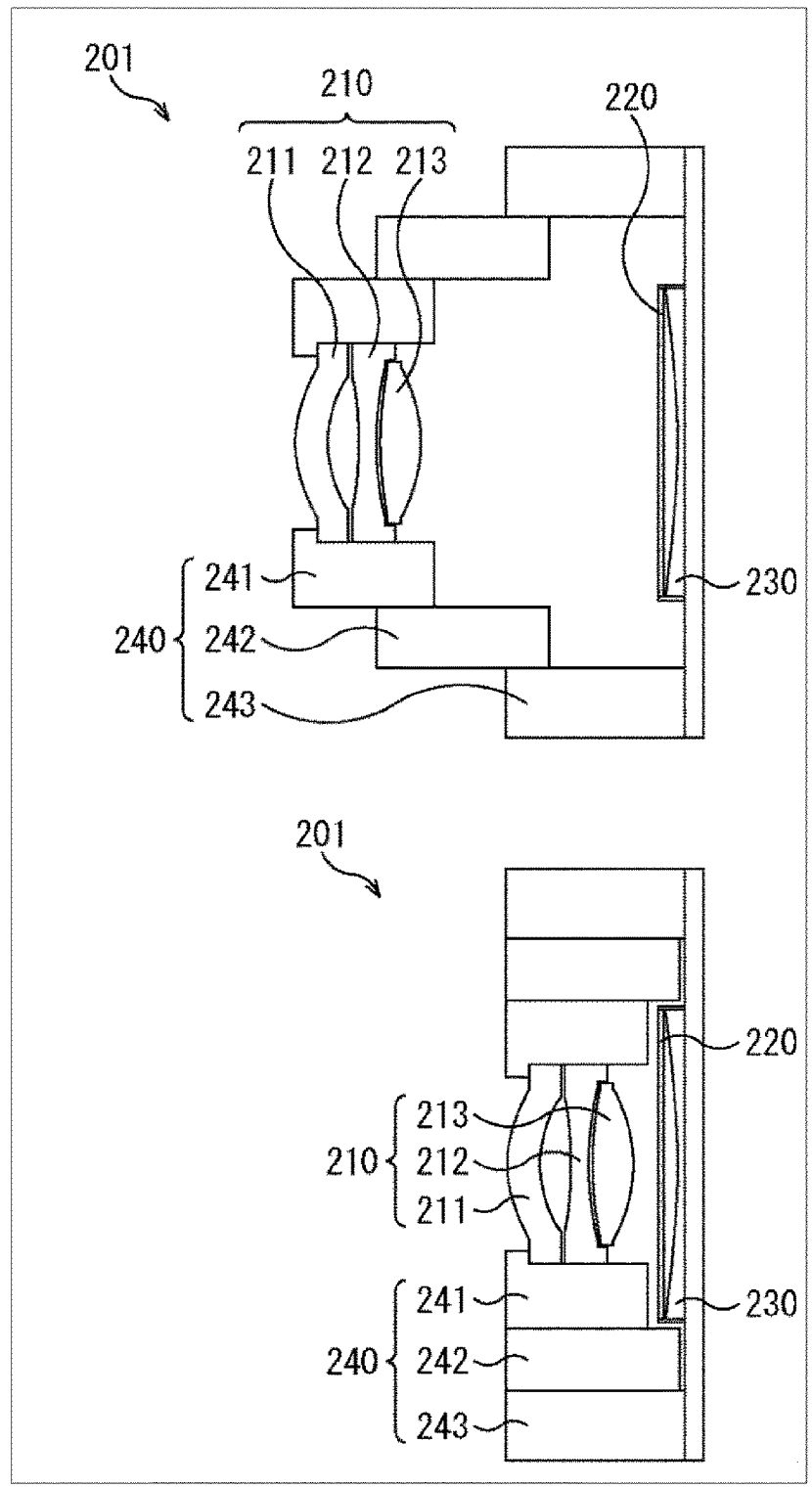
FIG. 10 shows an exemplary configuration of an embodiment of an imaging apparatus to which the present technology is applied.

FIG. 10 shows an exemplary configuration of an embodiment of an imaging apparatus to which the present technology is applied.

The imaging apparatus 201 in FIG. 10 includes a lens group 210, a cover glass 220, an image sensor 230 and a lens barrel 240. The imaging apparatus 201 in FIG. 10 is mounted on a small electronic device such as a mobile phone or a mobile PC, for example.

The lens group 210, which designed as a fixed focal length lens, includes a lens element 211, a lens element 212 and a lens element 213, being first to third lens, respectively. The lens elements 211 to 213 are arranged in numerical order from the object (photographic subject) side toward a light-receiving surface of the image sensor 230. The lens element 211 has a meniscus shape, so that the object-side surface thereof is convex toward an object and the light-receiving surface (image) side surface is convex toward an object, too.

The image sensor 230 is realized by a high-resolution charged couple device (CCD) image sensor, a high-resolution complementary metal oxide semiconductor (CMOS) image sensor, or the like, and is covered with the cover glass 220, formed of a resin or glass. The light-receiving surface of the image sensor 230 is arranged in an image forming plane of the lens group 210, and has a shape curved concavely toward the lens group 210.

Though not shown, optical members such as an infrared cut-off filter and a low-pass filter may be placed either to the object side of the lens group 210 or between the lens group 210 and the image sensor 230.

The lens barrel 240 includes a first barrel body 241, a second barrel body 242, and a third barrel body 243. The first barrel body 241 holds the lens group 210, and is stowable on the inner diameter side of the second barrel body 242 and extendable from the second barrel body 242. The second barrel body 242 is stowable on the inner diameter side of the third barrel body 243 and extendable from the third barrel body 243. The third barrel body 243 is arranged in a manner that the image-side end thereof is fixed onto a base board on which the image sensor 230 is fixed.

The above configuration enables the imaging apparatus 201 to be switched between: a state (protruding state) shown in the upper part of FIG. 10 where the lens barrel 240 protrudes out; and a state (retracted state) shown in the lower part of FIG. 10 where the lens barrel 240 is retracted in. The imaging apparatus 201 is in the protruding state during imaging, but in the retracted state not during imaging.

Accordingly, the lens group 210 has to provide high image-forming performance with less optical aberrations in the protruding state, that is, in a state where a distance (back focus) is increased between the light-receiving surface of the image sensor 230 and the lens surface (light-receiving surface side lens surface of the lens element 213), closest to the light-receiving surface, of the lens group 210.

There has been recently known a technique to suppress optical aberrations by curving an image plane concavely toward the object side and by distorting the image plane in correspondence with an exit pupil distance. Accordingly, the imaging apparatus of the present technology causes the lens group 210 to generate negative (barrel) optical distortion or negative (barrel) TV distortion in the protruding state, in which the exit pupil distance increases.

In the technique, it has been proposed to curve an image plane in a spherical shape. However, when using a concave or convex lens, image plane correction necessary to an area around the outermost periphery (100% image height) is lesser than image plane correction necessary to an area in middle and lower image height range including the optical axis, due to the thickness of an outermost peripheral end of the lens.

Accordingly, the light-receiving surface of the image sensor 230 has such an aspherical shape that a tangential angle between an external tangent to the edge (outermost peripheral end) of the light-receiving surface and a plane perpendicular to the optical axis of the lens group 213 can be smaller than the tangential angle of the light-receiving surface having a spherical shape.

Specifically, an intersection between the optical axis of the lens group 210 and a normal line of an external tangent to the light-receiving surface of the image sensor 230 at 90% image height is set to be farther from the light-receiving surface of the image sensor 230 than an intersection between the optical axis and a normal line of an external tangent to the light-receiving surface at any of 0 to 70% image heights.

Furthermore, the applicant of the present disclosure has searched for a way to simplify the lens group in the above configuration. As a result, at least as a lens group designed for an image sensor of 1/2.8 size or less whose maximum image height is 3.5 mm or less, no better solution has been found than a lens group including three lenses in three groups, like the lens group 210. Additionally, it has also been found that adding any lens to the image plane side will not enhance optical performance.

It has also been found that, in the lens group 210, a distance from the apex of the object-side lens surface of the lens element 211 to the apex of the image-side lens surface of the lens element 213 has to be minimized as possible as long as a required shape is secured, for manufacturing reasons.

Accordingly, the lens group 210 in this embodiment is configured so as to satisfy the following conditional expressions (1) to (5).

Firstly, the conditional expression (1) restricts the power of the lens element 211.

[Formula 1]

$$1 \leq |fg1/f| \leq 50 \quad (1)$$

In the conditional expression (1), f represents the focal length of the entire optical system (lens group 210), and fg1 represents the focal length of the lens element 211. The conditional expression (1) is necessary for the following reasons.

The larger |fg1/f| value means the smaller power of the lens element 211, which, by extension, does not serve as an aberration corrector. This degrades imaging performance, so that the upper limit for the |fg1/f| value is necessary.

Meanwhile, the smaller |fg1/f| value means the larger power of the lens element 211, which, by extension, leads to an unrealistic design in view of manufacturing tolerances. Accordingly, the lower limit for the |fg1/f| value is necessary.

The conditional expression (2) restricts the power of the lens element 212.

[Formula 2]

$$-2 \leq fg2/f \leq -0.5 \quad (2)$$

In the conditional expression (2), fg2 represents the focal length of the lens element 212. The conditional expression (2) is necessary for the following reasons.

The smaller fg2/f value means the smaller power of the lens element 212, which, by extension, does not serve as an aberration corrector. This degrades imaging performance. Accordingly, the upper limit for the fg2/f value is necessary.

Meanwhile, the larger fg2/f value means the larger power of the lens element 212, which, by extension, leads to an unrealistic design in view of manufacturing tolerances. Accordingly, the lower limit for the fg2/f value is necessary.

The conditional expression (3) restricts the power of the lens element 213.

[Formula 3]

$$0.4 \leq fg3/f \leq 1 \quad (3)$$

In the conditional expression (3), fg3 represents the focal length of the lens element 213. The conditional expression (3) is necessary for the following reasons.

The larger fg3/f value means the larger incident angle of a chief ray incident on the image sensor 230, which, by extension, leads to incapability of achieving desirable imaging performance, so that the upper limit for the fg3/f value is necessary.

Meanwhile, the smaller fg3/f value means the larger power of the lens element 212, which, by extension, leads to an unrealistic design in view of manufacturing tolerances. Accordingly, the lower limit for the fg3/f value is necessary.

The conditional expression (4) restricts the lens shape to which the lens element 211 is bent into. As used herein, the term bend means to change a shape of a lens without changing its focal length.

[Formula 4]

$$qg1 \leq -3 \text{ or } qg1 > 10 \quad (4)$$

In the conditional expression (4), qg1 is defined by $qg1=(RgS1+RgS2)/(RgS2-RgS1)$, where RgS1 represents the curvature radius of the object-side lens surface of the lens element 211, and RgS2 represents the curvature radius of the light-receiving surface (image) side lens surface of the lens element 211, and will be referred herein to as a bending factor. The conditional expression (4) is necessary for the following reasons.

If the value of the bending factor qg1 is more than −3, the lens element 211 has a too negative meniscus shape, and thus increases chromatic aberration, which limits optical properties. Accordingly, the upper limit of −3 is necessary. Meanwhile, if the value of the bending factor qg1 is less than 10, the lens element 211 has a too positive meniscus shape, and thus increases comatic aberration and astigmatism outside with respect to the optical axis, which limits optical properties. Accordingly, the lower limit of 10 is necessary.

The conditional expression (5) restricts distances between the lens elements in the lens group 210.

[Formula 5]

$$(Tg1+Tg2+Tg3)>(D1+D2) \quad (5)$$

In the conditional expression (5), Tg1 to Tg3 respectively represent thicknesses of the lens elements 211 to 213 along the optical axis, D1 represents an air distance along the optical axis between the lens elements 211 and 212, and D2 represents an air distance along the optical axis between the lens elements 212 and 213.

When the conditional expression (5) is satisfied, the spaces between lenses are reduced enough.

When the conditional expressions (1) to (5) are all satisfied, the entire optical length and the back focus in the imaging apparatus 201 satisfy the following conditional expression (6) in the protruding state. As used herein, the entire optical length is a distance from the light-receiving surface of the image sensor 230 to the lens surface (object-side lens surface of the lens element 211), closest to an object, of the lens group 210.

[Formula 6]

$$BF/TT \geq 0.5 \qquad (6)$$

In the conditional expression (6), TT and BF represent the entire optical length and the back focus in the imaging apparatus 201, respectively.

Thus, when the conditional expression (6) is satisfied, the lens group 210 is arranged closer to the object side so that the back focus can be a half or more of the entire optical length.

Since arranged closer to the object side so that the back focus can be a half or more of the entire optical length, the lens group 210 is retractable. Thus, even when such an imaging apparatus using a relatively high-resolution image sensor is mounted on an electronic device such as a mobile phone, the height thereof can be more effectively reduced while high image-forming performance with less optical aberrations is achieved.

The shape of the aspherical surface of the fixed focal length lens in this embodiment is represented by the following aspherical equation, when X is assumed to be a distance from the tangent plane at the apex of the aspherical surface to a point, whose height from the optical axis is y, on the aspherical surface.

[Formula 7]
$$X = \frac{cy^2}{1 + \sqrt{1 - (1+k)c^2 y^2}} + Ay^4 + By^6 + Cy^8 + Dy^{10} + Ey^{12} + Fy^{14}$$

In the aspherical equation, the direction from the object side to the image plane side assumed to be positive, k represents the conic constant, and c represents the inverse (1/r) of the curvature radius r of the apex of the aspherical surface. Meanwhile, A to F represent 4th, 6th, 8th, 10th, 12th and 14th order aspherical coefficients, respectively.

Note that, though, in the imaging apparatus to which the present technology is applied, the lens group consists of the first to third lens, thus having the configuration of three lenses in three groups, the lens group has only to include at least first to third lens. Accordingly, one or more (the number may be set as appropriate) additional lenses can be provided to the object side of the configuration of three lenses in three groups, for example.

Hereinafter, description will be given of specific examples of the imaging apparatus in the above embodiment.

Example 1

Figure 11:
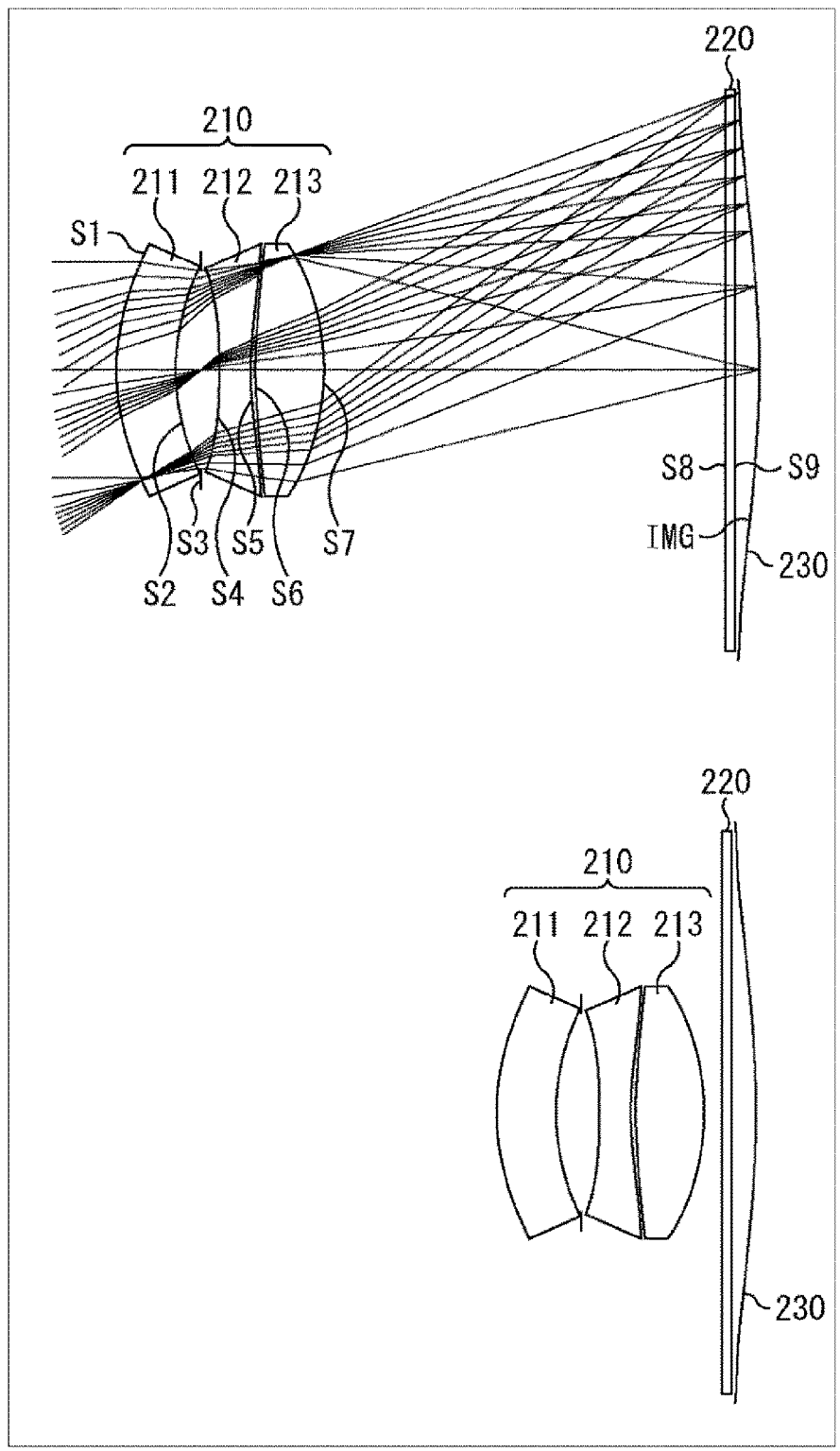
FIG. 11 shows an exemplary configuration of an imaging apparatus in Example 1.

FIG. 11 shows an exemplary configuration of an imaging apparatus for a 1/3.2 size 8-megapixel CMOS image sensor with a pixel pitch of 1.4 μm, which is similar to Conventional Example 1 (FIG. 1). The upper part of FIG. 11 shows the imaging apparatus in the protruding state, while the lower part of FIG. 11 shows the imaging apparatus in the retracted state.

The imaging apparatus in FIG. 11 includes the lens group 210, the cover glass 220 and the image sensor 230.

The lens group 210 includes the lens element 211, a diaphragm and the lens elements 212 and 213, which are arranged in the listed order from the object side toward the light-receiving surface of the image sensor 230. The lens element 211 has a meniscus shape, so that the object-side surface thereof is convex toward an object and the light-receiving surface (image) side surface is convex toward an object, too.

The lens element 211 has a shape of weak positive power so as not to increase an incident angle on the adjacent diaphragm. The lens element 212 has a negative power and a small Abbe number (high dispersion). The lens element 213 has a strong positive power and a large Abbe number (low dispersion). This lens configuration realizes chromatic aberration correction and minimization of the incident angle of a chief ray incident on the image sensor 230.

The light-receiving surface of the image sensor 230 has an aspherical shape curved concavely toward the lens group 210.

In FIG. 11, the surfaces of the lens element 211, the diaphragm, the lens elements 212 and 213 and the cover glass 220, and the light-receiving surface of the image sensor 230 are denoted by the surface numbers of S1, S2, S3, S4, S5, S6, S7, S8, S9, IMG, respectively.

Table 3 shows the curvature radius R (mm), the distance d (mm), the refractive index nd and the dispersion value vd of each of the surfaces corresponding to the surface numbers in the imaging apparatus in FIG. 11.

TABLE 3

| Surface number | R | d | nd | vd |
|---|---|---|---|---|
| S1 | 2.41 | 0.607 | 1.63 | 23.0 |
| S2 | 2.32 | 0.259 | | |
| S3 | INFINITY | 0.188 | | |
| S4 | −12.05 | 0.320 | 1.63 | 23.0 |
| S5 | 3.20 | 0.051 | | |
| S6 | 5.79 | 0.709 | 1.80 | 45.5 |
| S7 | −2.55 | 4.116 | | |
| S8 | INFINITY | 0.100 | 1.52 | 64.2 |
| S9 | INFINITY | 0.250 | | |
| IMG | −9.55 | 0.000 | | |

Table 4 shows the 4th, 6th, 8th and 10th order aspherical coefficients of each of the surfaces of the imaging apparatus in FIG. 11 including aspherical surfaces, which are the surfaces S1 and S2 of the lens element 211, the surfaces S4 and S5 of the lens element 212, the surfaces S6 and S7 of the lens element 213, and the light-receiving surface IMG of the image sensor 230. In Table 4, K represents the conic constant, and A to D represent 4th, 6th, 8th and 10th order aspherical coefficients, respectively.

TABLE 4

| Surface S1 | K: −0.969 | A: 0.312E−02 | B: −0.325E−02 | C: −0.262E−03 | D: −0.579E−03 |
| Surface S2 | K: −0.622 | A: 0.670E−02 | B: −0.425E−02 | C: 0.392E−03 | D: −0.238E−02 |
| Surface S4 | K: −0.983 | A: −0.104E+00 | B: 0.431E−01 | C: −0.204E−01 | D: 0.274E−02 |
| Surface S5 | K: 0.320 | A: −0.963E−01 | B: 0.348E−01 | C: −0.168E−01 | D: 0.542E−02 |
| Surface S6 | K: −0.879 | A: −0.794E−02 | B: −0.140E−01 | C: 0.482E−02 | D: 0.196E−03 |
| Surface S7 | K: 1.000 | A: 0.324E−02 | B: 0.117E−02 | C: 0.402E−03 | D: −0.642E−04 |
| Surface IMG | K: 0.829 | A: 0.689E−02 | B: −0.137E−02 | C: 0.212E−03 | D: −0.115E−04 |

Table 5 shows the focal length f, the numerical aperture F, the half angle of view ω, the lens length H and the back focus BF of the lens group 210 of the imaging apparatus in the protruding state in the upper part of FIG. 11. In Example 1, the focal length f is set to 4.7 mm, the numerical aperture F is set to 2.1, the half angle of view ω is set to 35.0 degrees, the lens length H is set to 2.1 mm; and the back focus BF is set to 4.47 mm Thus, the entire optical length is 6.6 mm.

TABLE 5 f (focal length) = 4.7 mm
F (numerical aperture) = 2.1
ω (half angle of view) = 35.0 deg
H (entire lens length) = 2.1 mm
BF (back focus) = 4.47 mm Table 6 shows that the conditional expressions (1) to (4) and (6) were satisfied in Example 1.

TABLE 6

| Conditional expression (1) | 13.4 |
|---|---|
| Conditional expression (2) | −0.84 |
| Conditional expression (3) | 0.49 |
| Conditional expression (4) | −53 |
| Conditional expression (6) | 0.68 |

As shown in Table 6, the conditions defined by the conditional expressions (1) to (4) and (6) were satisfied in Example 1.

Figure 12:
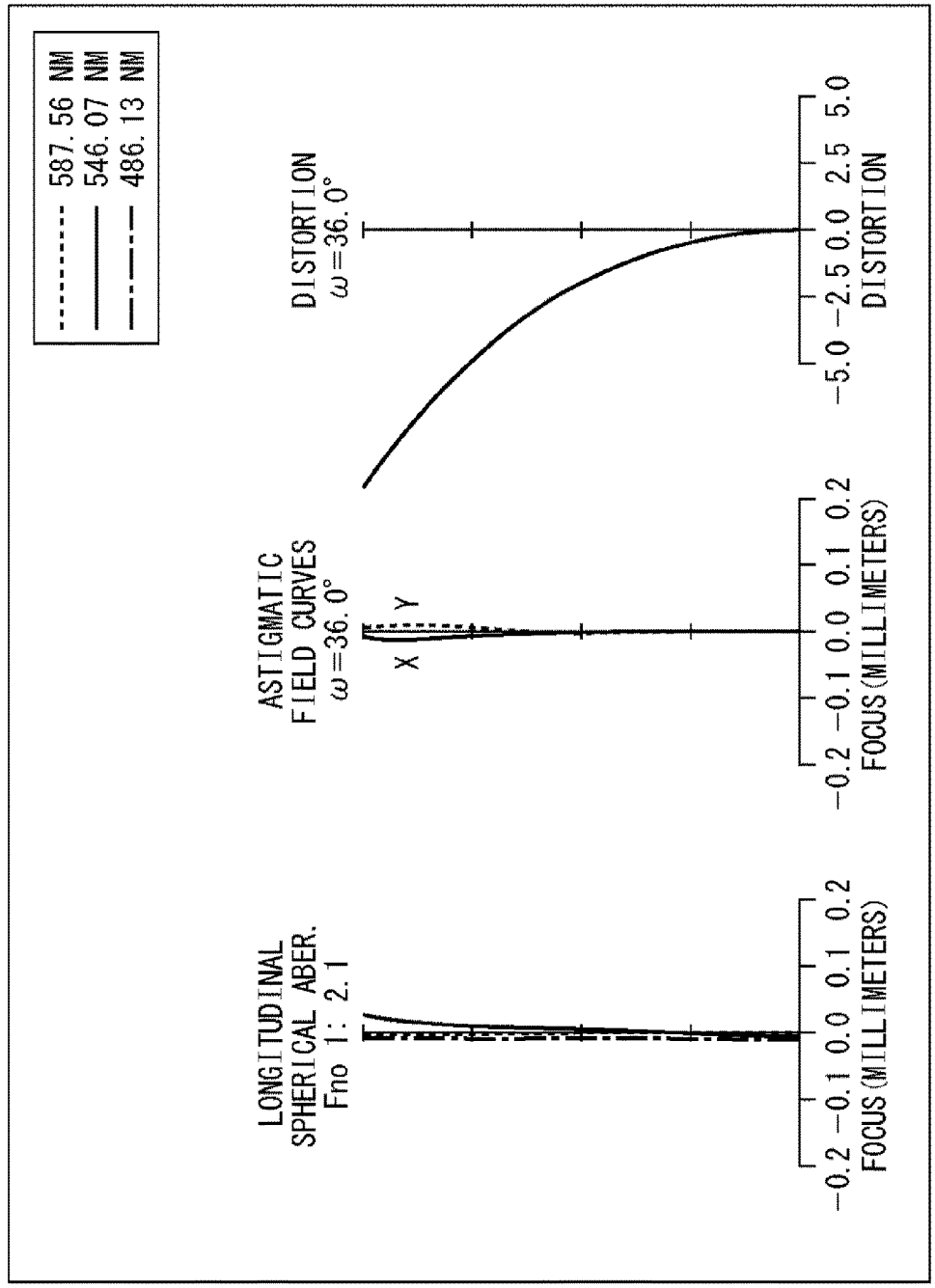
FIG. 12 is an aberration graph showing spherical aberration, astigmatism and distortion in Example 1.

FIG. 12 is an aberration graph showing spherical aberration (chromatic aberration), astigmatism and distortion in Example 1. The left part of FIG. 12 shows spherical aberration (chromatic aberration), the middle part of FIG. 12 shows astigmatism, and the right part of FIG. 12 shows distortion.

Figure 13:
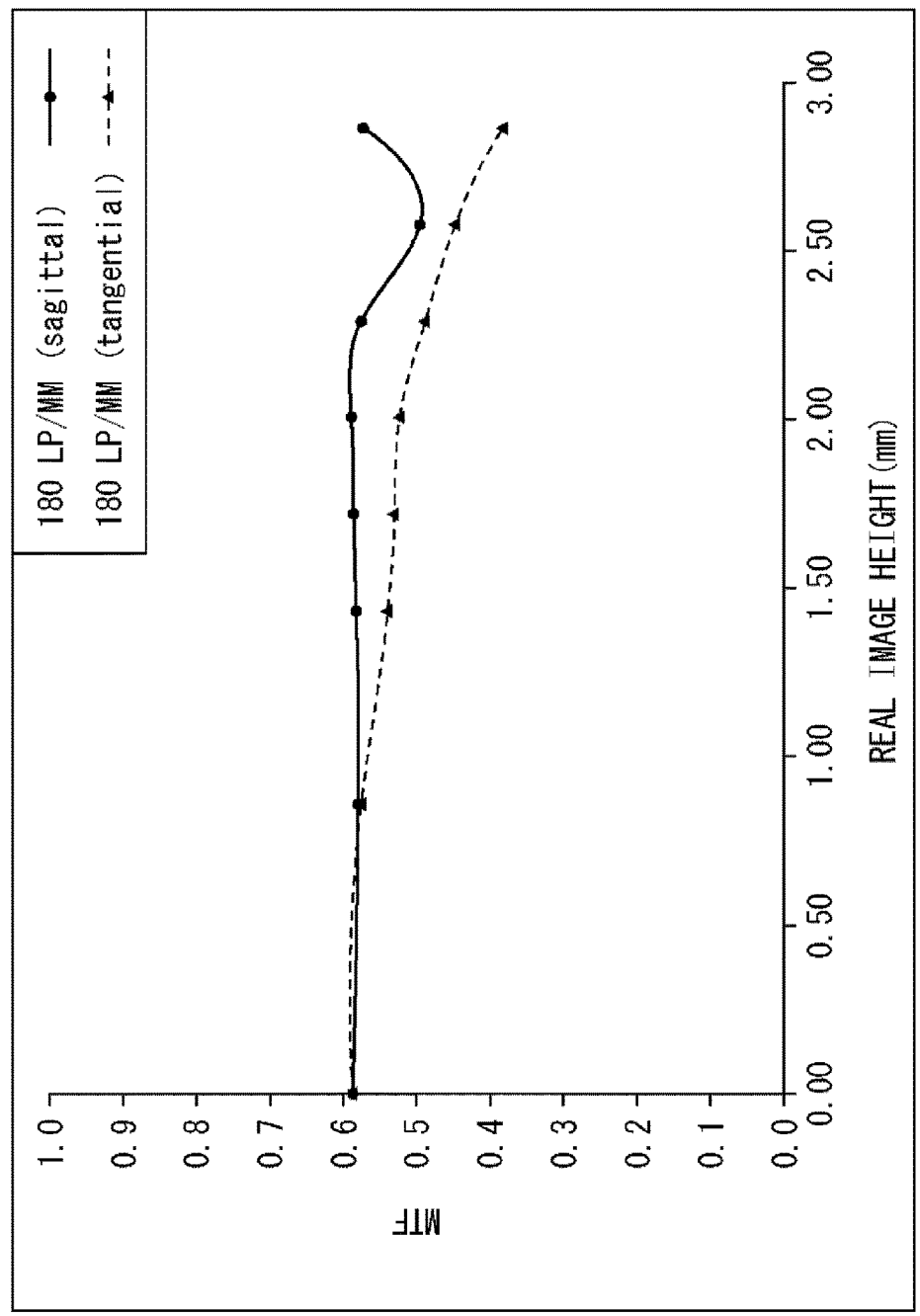
FIG. 13 shows image height dependence of MTF in Example 1.

FIG. 13 shows image height dependence of MTF in Example 1.

According to Example 1, the aberrations of spherical aberration, astigmatism and distortion were all satisfactorily corrected, as shown in FIG. 12. Though the numerical aperture is 2.1, which indicates high brightness, and though the half angle of view is as wide as 36.0 degrees, the MTF value at 180 lp/mm is 0.5 or more, which is high enough to achieve high resolution, in approximately the whole region in both the sagittal and tangential directions, as shown in FIG. 13.

Figure 14:
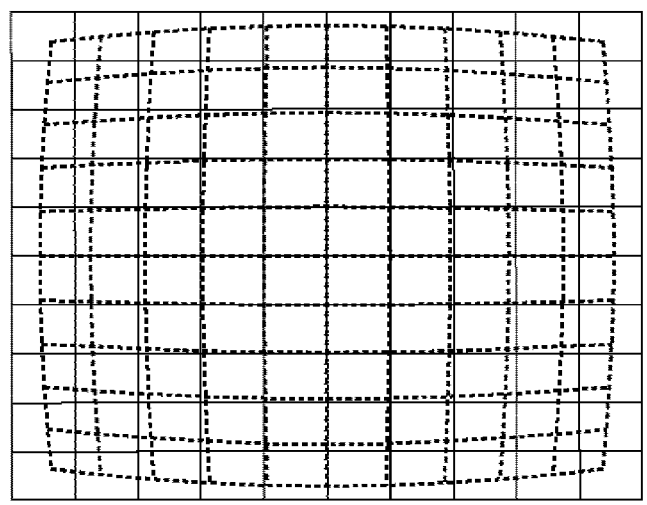
FIG. 14 shows a distortion lattice in Example 1.

Moreover, in the protruding state in Example 1, the exit pupil distance increases since the back focus BF becomes 4.47 mm while the entire optical length becomes 6.6 mm. Accordingly, the lens group 210 is caused to generate 9.68% negative (barrel) optical distortion and 3.8% negative (barrel) TV distortion as shown in FIG. 14. Then, at the time of image outputting (when the image sensor is driven to retrieve imaging signals), distortion correction is performed by signal processing, and thereby a desirable imaged image with no distortion can be obtained.

Hereinafter, comparison will be given between Example 1 and Conventional Example 1 using a similar image sensor.

In the imaging apparatus in Conventional Example 1, the entire optical length is set to around 4.5 mm so as not to adversely affect the design of an electronic device on which the imaging apparatus is mounted, but a small numerical aperture is not achieved. On the other hand, the imaging apparatus in Example 1 achieves a smaller numerical aperture and a higher MTF value than in the imaging apparatus in Conventional Example 1, and thus is highly merchantable.

When the imaging apparatus in Conventional Example 1 is mounted on a mobile phone, the mobile phone has a thickness of approximately 8 mm in the lens portion, as described above. On the other hand, when the imaging apparatus in Example 1 is mounted on a mobile phone, since the entire optical length can be reduced to approximately 2.1 mm (entire lens length) by retracting the lens group 210 in the mobile phone, the thickness of the mobile phone can be suppressed to approximately 6.1 mm, which can make the mobile phone highly merchantable.

Note that, since the entire optical length in the imaging apparatus in Example 1 is as small as 6.6 mm even in the protruding state, the thickness of an electronic device on which the imaging apparatus is mounted is sufficiently suppressed even if the lens group is unretractable.

Example 2

Figure 15:
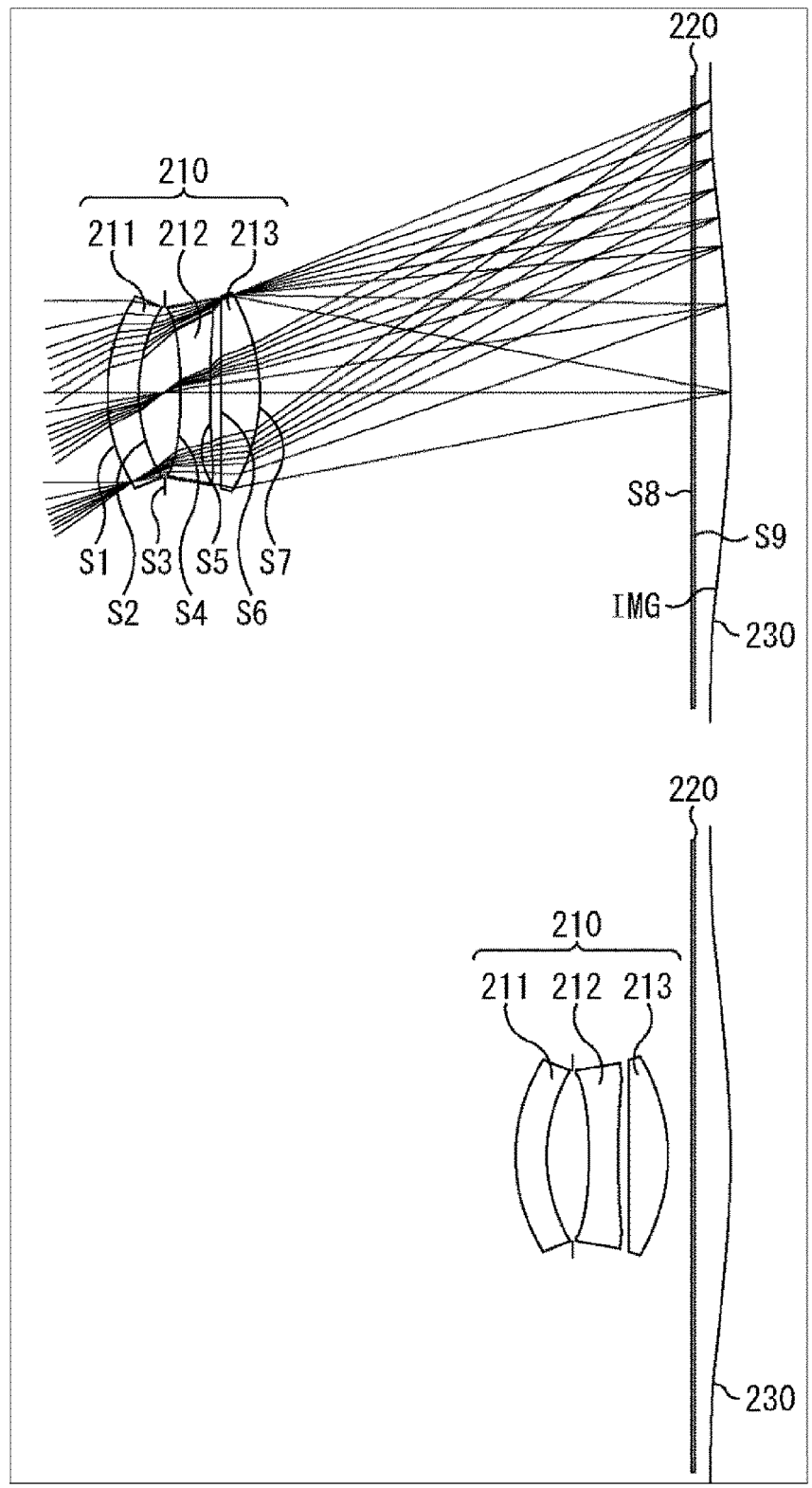
FIG. 15 shows an exemplary configuration of an imaging apparatus in Example 2.

FIG. 15 shows an exemplary configuration of an imaging apparatus for a 1/1.12 size 40-megapixel CMOS image sensor with a pixel pitch of 1.75 μm, which is similar to Conventional Example 2 (FIG. 5). The upper part of FIG. 15 shows the imaging apparatus in the protruding state, while the lower part of FIG. 15 shows the imaging apparatus in the retracted state.

The imaging apparatus in FIG. 15 includes the lens group 210, the cover glass 220 and the image sensor 230.

The lens group 210 includes the lens element 211, a diaphragm and the lens elements 212 and 213, which are arranged in the listed order from the object side toward the light-receiving surface of the image sensor 230. The lens element 211 has a meniscus shape, so that the object-side surface thereof is convex toward an object and the light-receiving surface (image) side surface is convex toward an object, too.

The lens element 211 has a shape of weak positive power so as not to increase an incident angle on the adjacent diaphragm. The lens element 212 has a negative power and a small Abbe number (high dispersion). The lens element 213 has a strong positive power and a large Abbe number (low dispersion). This lens configuration realizes chromatic aberration correction and minimization of the incident angle of a chief ray incident on the image sensor 230.

The light-receiving surface of the image sensor 230 has an aspherical shape curved concavely toward the lens group 210.

In FIG. 15, the surfaces of the lens element 211, the diaphragm, the lens elements 212 and 213 and the cover glass 220, and the light-receiving surface of the image sensor 230 are denoted by the surface numbers of S1, S2, S3, S4, S5, S6, S7, S8, S9, IMG, respectively.

Table 7 shows the curvature radius R (mm), the distance d (mm), the refractive index nd and the dispersion value vd of each of the surfaces corresponding to the surface numbers in the imaging apparatus in FIG. 15.

TABLE 7

| Surface number | R | d | nd | vd |
|---|---|---|---|---|
| S1 | 4.64 | 0.886 | 1.63 | 23.0 |
| S2 | 4.53 | 0.710 | | |
| S3 | INFINITY | 0.426 | | |
| S4 | −29.95 | 0.807 | 1.63 | 23.0 |
| S5 | 10.62 | 0.319 | | |
| S6 | 146.77 | 1.051 | 1.76 | 51.1 |
| S7 | −5.31 | 11.910 | | |
| S8 | INFINITY | 0.100 | 1.52 | 64.2 |

TABLE 7-continued

| Surface number | R | d | nd | vd |
|---|---|---|---|---|
| S9 | INFINITY | 1.000 | | |
| IMG | −28.70 | 0.000 | | |

Table 8 shows the 4th, 6th, 8th and 10th order aspherical coefficients of each of the surfaces of the imaging apparatus in FIG. 15 including aspherical surfaces, which are the surfaces S1 and S2 of the lens element 211, the surfaces S4 and S5 of the lens element 212, the surfaces S6 and S7 of the lens element 213, and the light-receiving surface IMG of the image sensor 230. In Table 8, K represents the conic constant, and A to D represent 4th, 6th, 8th and 10th order aspherical coefficients, respectively.

TABLE 8

| Surface S1 | K: 1.000 | A: −0.164E−02 | B: −0.655E−04 | C: −0.657E−05 | D: −0.680E−06 |
| Surface S2 | K: 1.000 | A: −0.191E−02 | B: −0.746E−05 | C: −0.109E−04 | D: −0.136E−05 |
| Surface S4 | K: −1.000 | A: −0.108E−01 | B: 0.496E−03 | C: −0.253E−04 | D: −0.244E−05 |
| Surface S5 | K: 1.000 | A: −0.880E−02 | B: 0.690E−03 | C: −0.367E−04 | D: 0.389E−06 |
| Surface S6 | K: 1.000 | A: −0.379E−03 | B: −0.554E−04 | C: 0.144E−04 | D: −0.836E−06 |
| Surface S7 | K: −0.374 | A: −0.716E−03 | B: −0.148E−04 | C: −0.116E−06 | D: 0.306E−06 |
| Surface IMG | K: 1.000 | A: 0.139E−03 | B: 0.0 | C: 0.0 | D: 0.0 |

Table 9 shows the focal length f, the numerical aperture F, the half angle of view ω, the lens length H and the back focus BF of the lens group 210 of the imaging apparatus in the protruding state in the upper part of FIG. 15. In Example 2, the focal length f is set to 13.0 mm, the numerical aperture F is set to 2.64, the half angle of view ω is set to 34.5 degrees, the lens length H is set to 4.2 mm; and the back focus BF is set to 13.0 mm Thus, the entire optical length is 17.2 mm.

TABLE 9

| f (focal length) = 13.0 mm |
| F (numerical aperture) = 2.64 |
| ω (half angle of view) = 34.5 deg |
| H (entire lens length) = 4.2 mm |
| BF (back focus) = 13.0 mm |

Table 10 shows that the conditional expressions (1) to (4) and (6) were satisfied in Example 2.

TABLE 10

| Conditional expression (1) | 11.0 |
| Conditional expression (2) | −0.94 |
| Conditional expression (3) | 0.52 |
| Conditional expression (4) | −83 |
| Conditional expression (6) | 0.76 |

As shown in Table 10, the conditions defined by the conditional expressions (1) to (4) and (6) were satisfied in Example 2.

Figure 16:
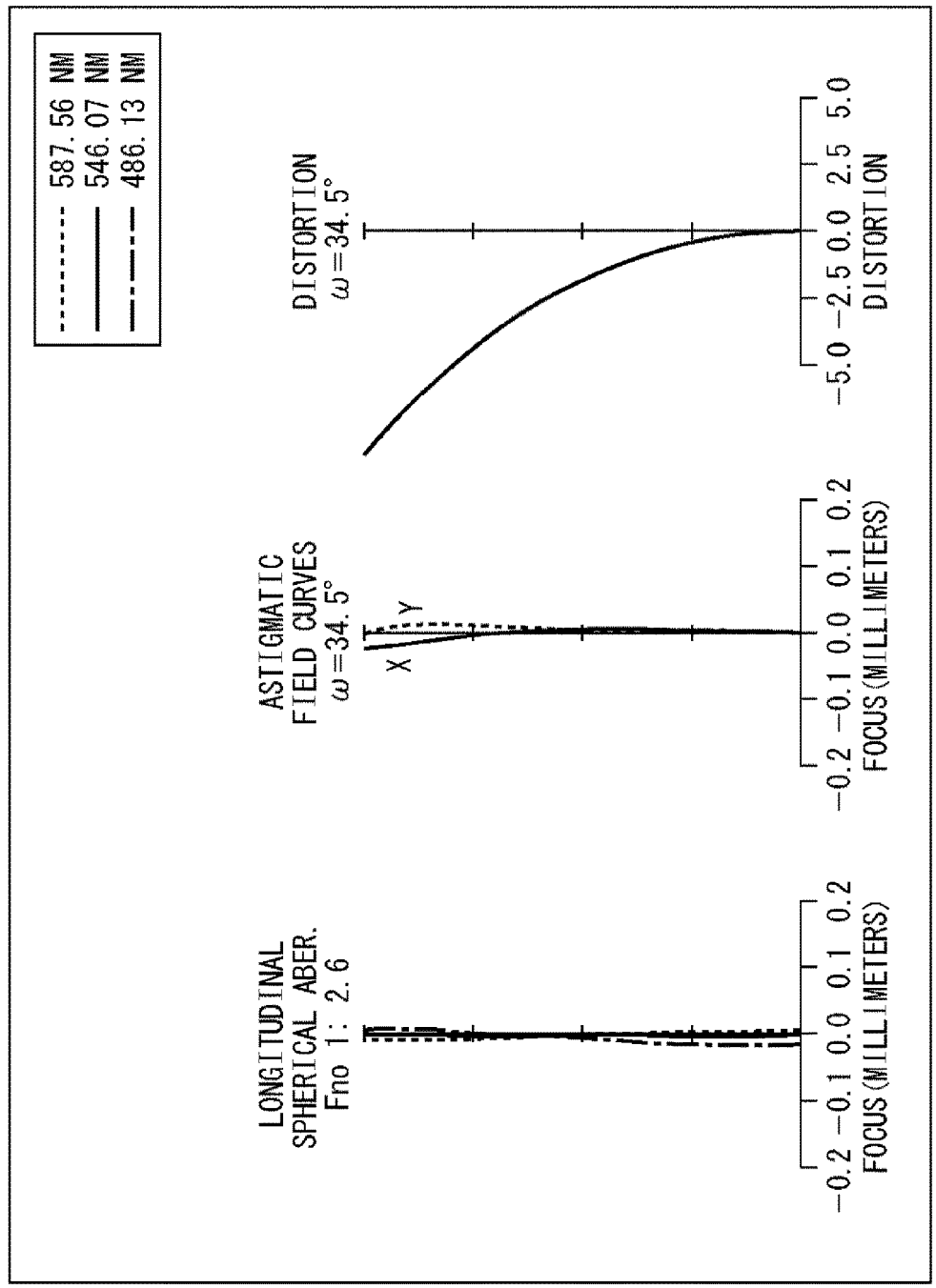
FIG. 16 is an aberration graph showing spherical aberration, astigmatism and distortion in Example 2.

FIG. 16 is an aberration graph showing spherical aberration (chromatic aberration), astigmatism and distortion in Example 2. The left part of FIG. 16 shows spherical aberration (chromatic aberration), the middle part of FIG. 16 shows astigmatism, and the right part of FIG. 16 shows distortion.

Figure 17:
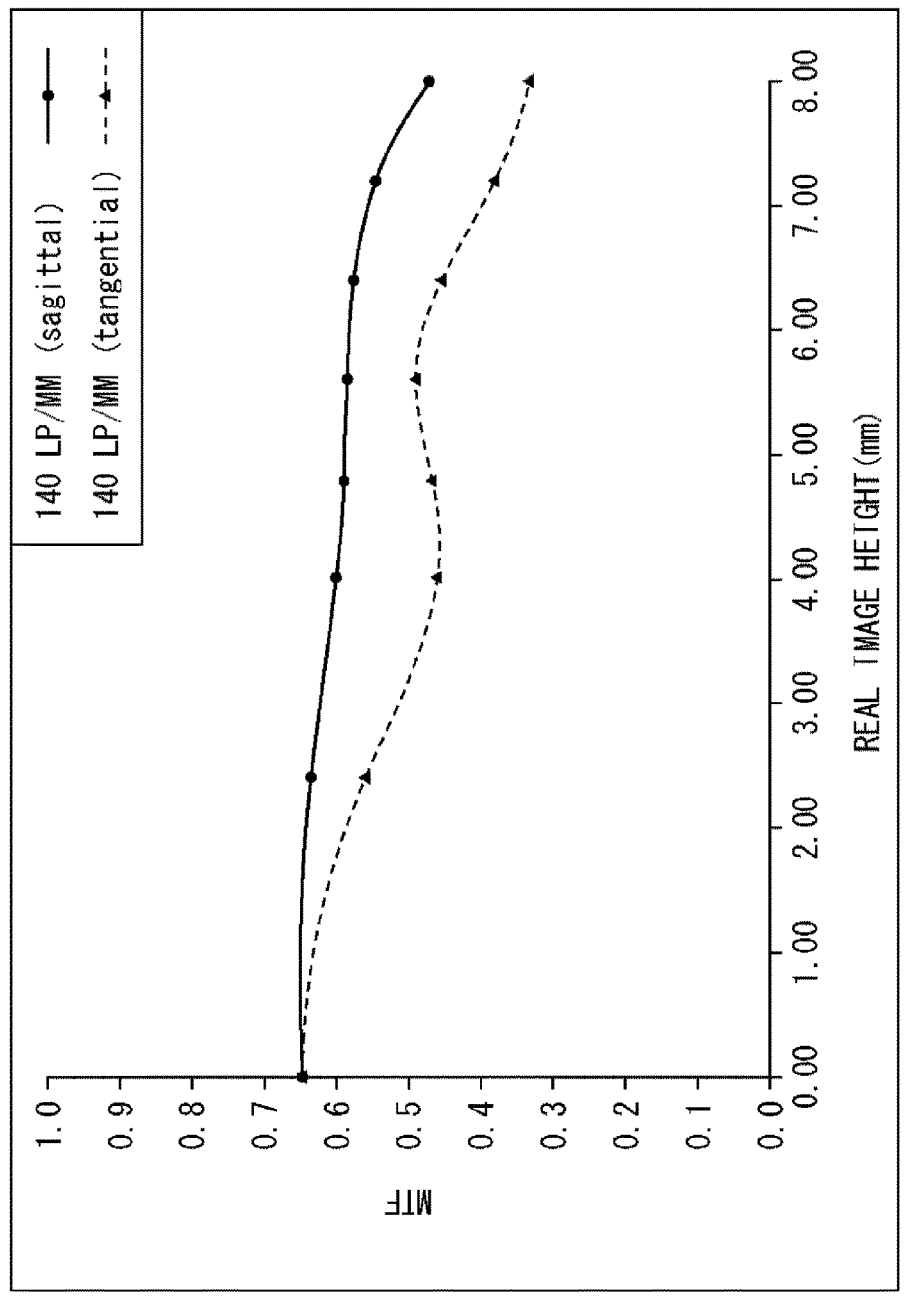
FIG. 17 shows image height dependence of MTF in Example 2.

FIG. 17 shows image height dependence of MTF in Example 2.

According to Example 2, the aberrations of spherical aberration, astigmatism and distortion were all satisfactorily corrected, as shown in FIG. 16. Though the numerical aperture is 2.6, which indicates high brightness, and though the half angle of view is as wide as 34.5 degrees, the MTF value at 140 lp/mm is 0.5 or more, which is high enough to achieve high resolution, in approximately the whole region in both the sagittal and tangential directions, as shown in FIG. 17.

Figure 18:
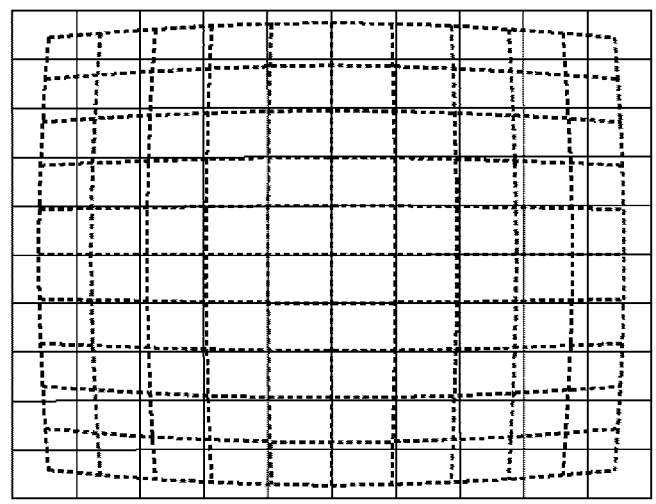
FIG. 18 shows a distortion lattice in Example 2.

Moreover, in the protruding state in Example 2, the exit pupil distance increases since the back focus BF becomes 13.0 mm while the entire optical length becomes 17.0 mm. Accordingly, the lens group 210 is caused to generate 8.33% negative (barrel) optical distortion and 3.3% negative (barrel) TV distortion as shown in FIG. 18. Then, at the time of image outputting, distortion correction is performed by signal processing, and thereby a desirable imaged image with no distortion can be obtained.

Hereinafter, comparison will be given between Example 2 and Conventional Example 2 using a similar image sensor.

Firstly, the imaging apparatus in Example 2 achieves a higher MTF value than in the imaging apparatus in Conventional Example 2, and thus is highly merchantable.

In addition, when the imaging apparatus in Conventional Example 2 is mounted on a mobile phone, the mobile phone has a shape from which the lens portion protrudes all times, thus having a thickness of approximately 16 mm in the lens portion, as has been described with reference to FIG. 9. On the other hand, when the imaging apparatus in Example 2 is mounted on a mobile phone, since the entire optical length can be reduced to approximately 4.2 mm (entire lens length) by retracting the lens group 210 in the mobile phone, the thickness of the mobile phone can be suppressed to approximately 8.2 mm, which can make the mobile phone highly merchantable.

Example 3

Figure 19:
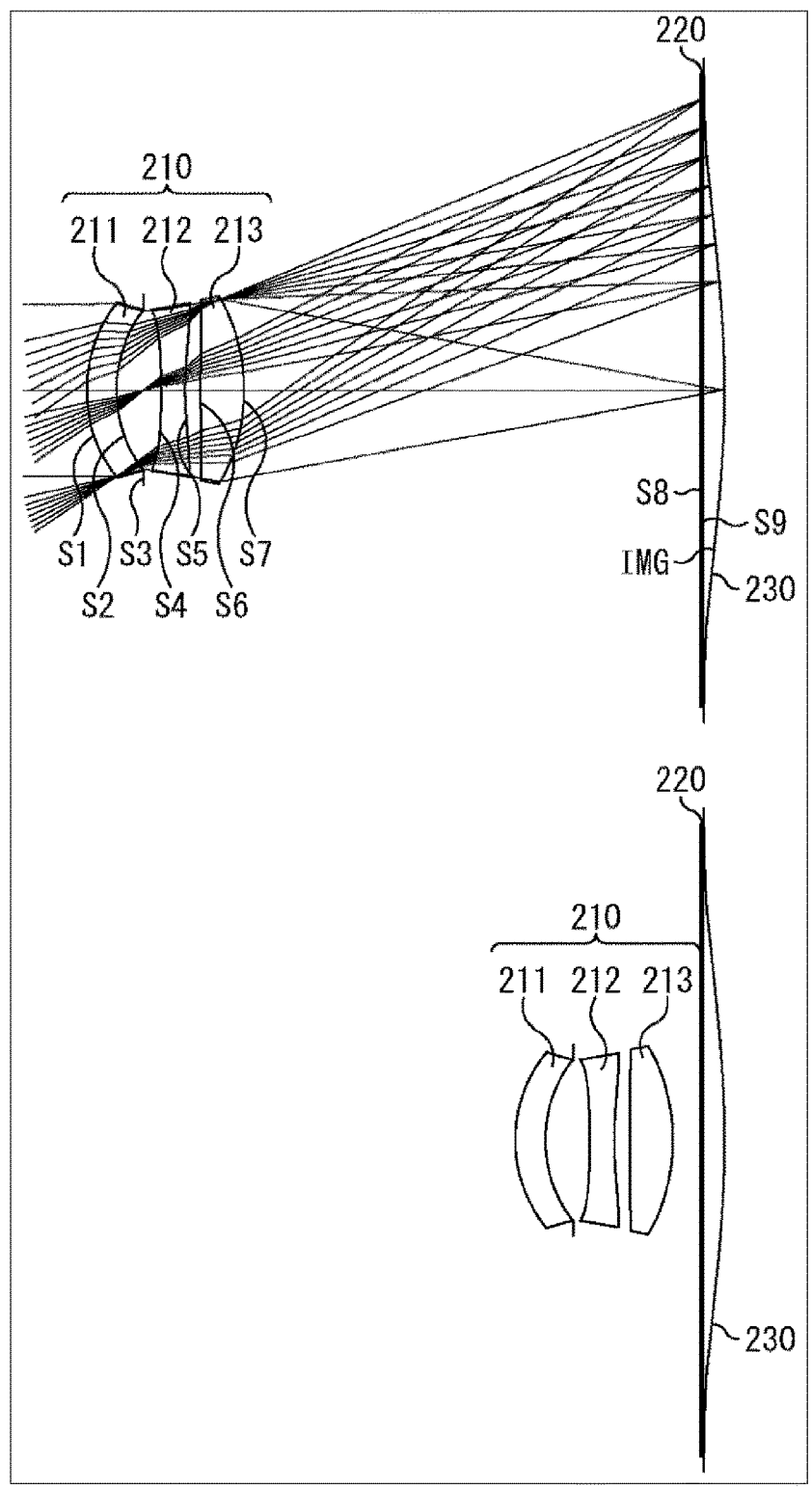
FIG. 19 shows an exemplary configuration of an imaging apparatus in Example 3.

FIG. 19 shows an exemplary configuration of an imaging apparatus for an APS-C size 100-megapixel CMOS image sensor with a pixel pitch of 1.75 μm. The upper part of FIG. 19 shows the imaging apparatus in the protruding state, while the lower part of FIG. 19 shows the imaging apparatus in the retracted state.

The imaging apparatus in FIG. 19 includes the lens group 210, the cover glass 220 and the image sensor 230.

The lens group 210 includes the lens element 211, a diaphragm and the lens elements 212 and 213, which are arranged in the listed order from the object side toward the light-receiving surface of the image sensor 230. The lens element 211 has a meniscus shape, so that the object-side surface thereof is convex toward an object and the light-receiving surface (image) side surface is convex toward an object, too.

The lens element 211 has a shape of weak positive power so as not to increase an incident angle on the adjacent diaphragm. The lens element 212 has a negative power and a small Abbe number (high dispersion). The lens element 213 has a strong positive power and a large Abbe number (low dispersion). This lens configuration realizes chromatic aberration correction and minimization of the incident angle of a chief ray incident on the image sensor 230.

The light-receiving surface of the image sensor 230 has an aspherical shape curved concavely toward the lens group 210.

In FIG. 19, the surfaces of the lens element 211, the diaphragm, the lens elements 212 and 213 and the cover glass 220, and the light-receiving surface of the image sensor 230 are denoted by the surface numbers of S1, S2, S3, S4, S5, S6, S7, S8, S9, IMG, respectively.

Table 11 shows the curvature radius R (mm), the distance d (mm), the refractive index nd and the dispersion value νd of each of the surfaces corresponding to the surface numbers in the imaging apparatus in FIG. 19.

TABLE 11

| Surface number | R | d | nd | νd |
| --- | --- | --- | --- | --- |
| S1 | 6.93 | 1.410 | 1.63 | 23.0 |
| S2 | 6.65 | 1.300 | | |
| S3 | INFINITY | 0.813 | | |
| S4 | −152.5 | 1.162 | 1.63 | 23.0 |
| S5 | 15.11 | 0.727 | | |
| S6 | 96.78 | 2.088 | 1.73 | 54.0 |
| S7 | −9.45 | 21.734 | | |
| S8 | INFINITY | 0.100 | 1.52 | 64.2 |
| S9 | INFINITY | 1.008 | | |
| IMG | −50.18 | 0.000 | | |

Table 12 shows the 4th, 6th, 8th and 10th order aspherical coefficients of each of the surfaces of the imaging apparatus in FIG. 19 including aspherical surfaces, which are the surfaces S1 and S2 of the lens element 211, the surfaces S4 and S5 of the lens element 212, the surfaces S6 and S7 of the lens element 213, and the light-receiving surface IMG of the image sensor 230. In Table 12, K represents the conic constant, and A to D represent 4th, 6th, 8th and 10th order aspherical coefficients, respectively.

TABLE 12

| Surface S1 | K: −0.626 | A: 0.274E−03 | B: 0.543E−05 | C: 0.150E−06 | D: −0.409E−08 |
| --- | --- | --- | --- | --- | --- |
| Surface S2 | K: 0.579 | A: −0.989E−04 | B: 0.565E−05 | C: 0.465E−08 | D: −0.865E−08 |
| Surface S4 | K: 1.000 | A: −0.224E−02 | B: 0.562E−04 | C: −0.985E−06 | D: −0.213E−07 |
| Surface S5 | K: 0.862 | A: −0.209E−02 | B: 0.667E−04 | C: −0.128E−05 | D: −0.214E−08 |
| Surface S6 | K: −0.763 | A: −0.145E−03 | B: −0.571E−05 | C: 0.498E−06 | D: −0.109E−07 |
| Surface S7 | K: −0.167 | A: −0.133E−03 | B: −0.244E−05 | C: −0.404E−07 | D: 0.184E−08 |
| Surface IMG | K: 0.994 | A: 0.318E−04 | B: −0.167E−07 | C: 0.0 | D: 0.0 |

Table 13 shows the focal length f, the numerical aperture F, the half angle of view ω, the lens length H and the back focus BF of the lens group 210 of the imaging apparatus in the protruding state in the upper part of FIG. 19. In Example 3, the focal length f is set to 22.6 mm, the numerical aperture F is set to 2.74, the half angle of view ω is set to 34.5 degrees, the lens length H is set to 7.5 mm; and the back focus BF is set to 22.8 mm Thus, the entire optical length is 30.3 mm

TABLE 13

| |
| --- |
| f (focal length) = 22.6 mm |
| F (numerical aperture) = 2.74 |
| ω (half angle of view) = 34.5 deg |
| H (entire lens length) = 7.5 mm |
| BF (back focus) = 22.8 mm |

Table 14 shows that the conditional expressions (1) to (4) and (6) were satisfied in Example 3.

TABLE 14

| | |
| --- | --- |
| Conditional expression (1) | 12.2 |
| Conditional expression (2) | −0.95 |
| Conditional expression (3) | 0.53 |
| Conditional expression (4) | −49 |
| Conditional expression (6) | 0.75 |

As shown in Table 14, the conditions defined by the conditional expressions (1) to (4) and (6) were satisfied in Example 3.

Figure 20:
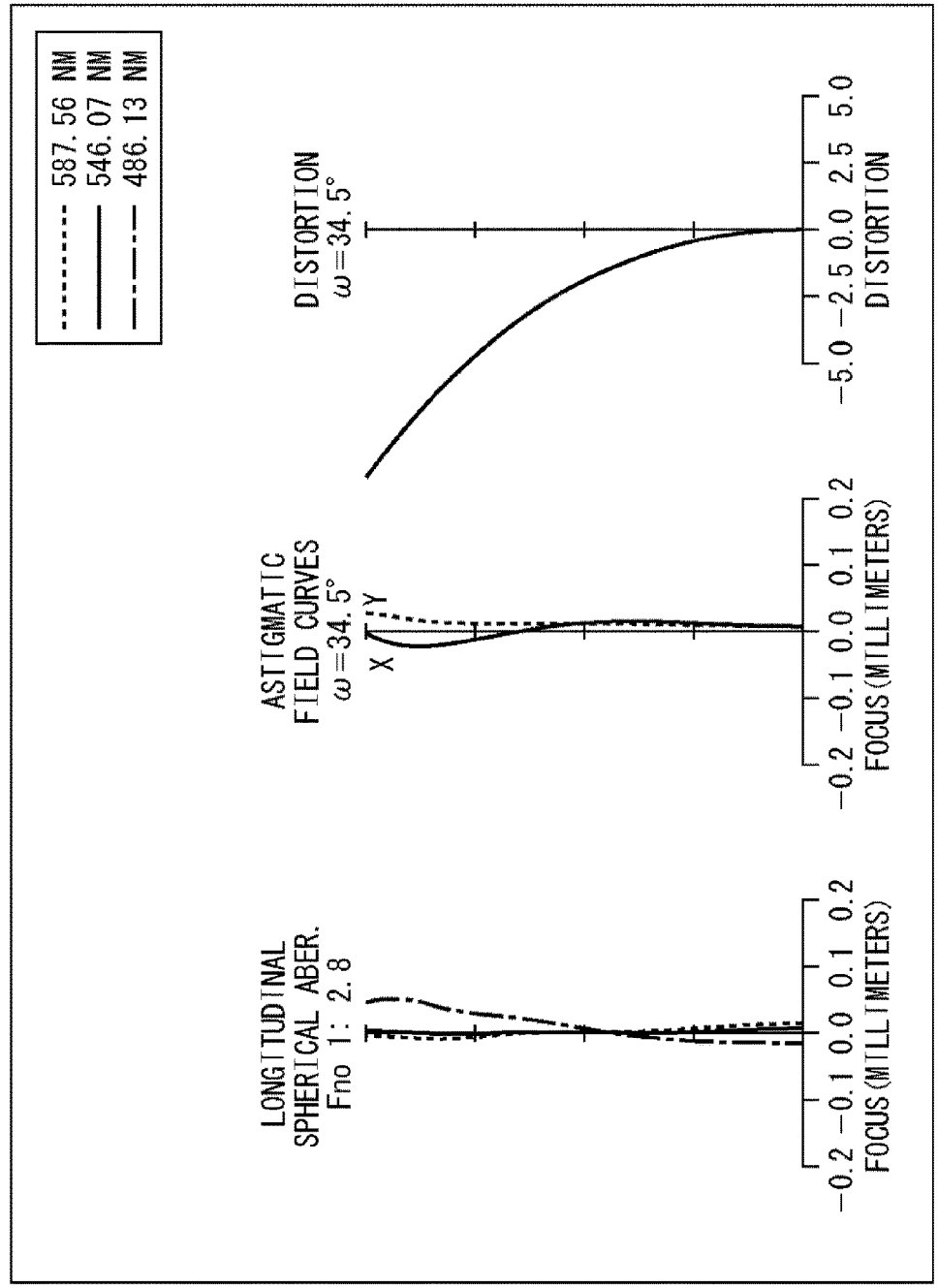
FIG. 20 is an aberration graph showing spherical aberration, astigmatism and distortion in Example 3.

FIG. 20 is an aberration graph showing spherical aberration (chromatic aberration), astigmatism and distortion in Example 3. The left part of FIG. 20 shows spherical aberration (chromatic aberration), the middle part of FIG. 20 shows astigmatism, and the right part of FIG. 20 shows distortion.

Figure 21:
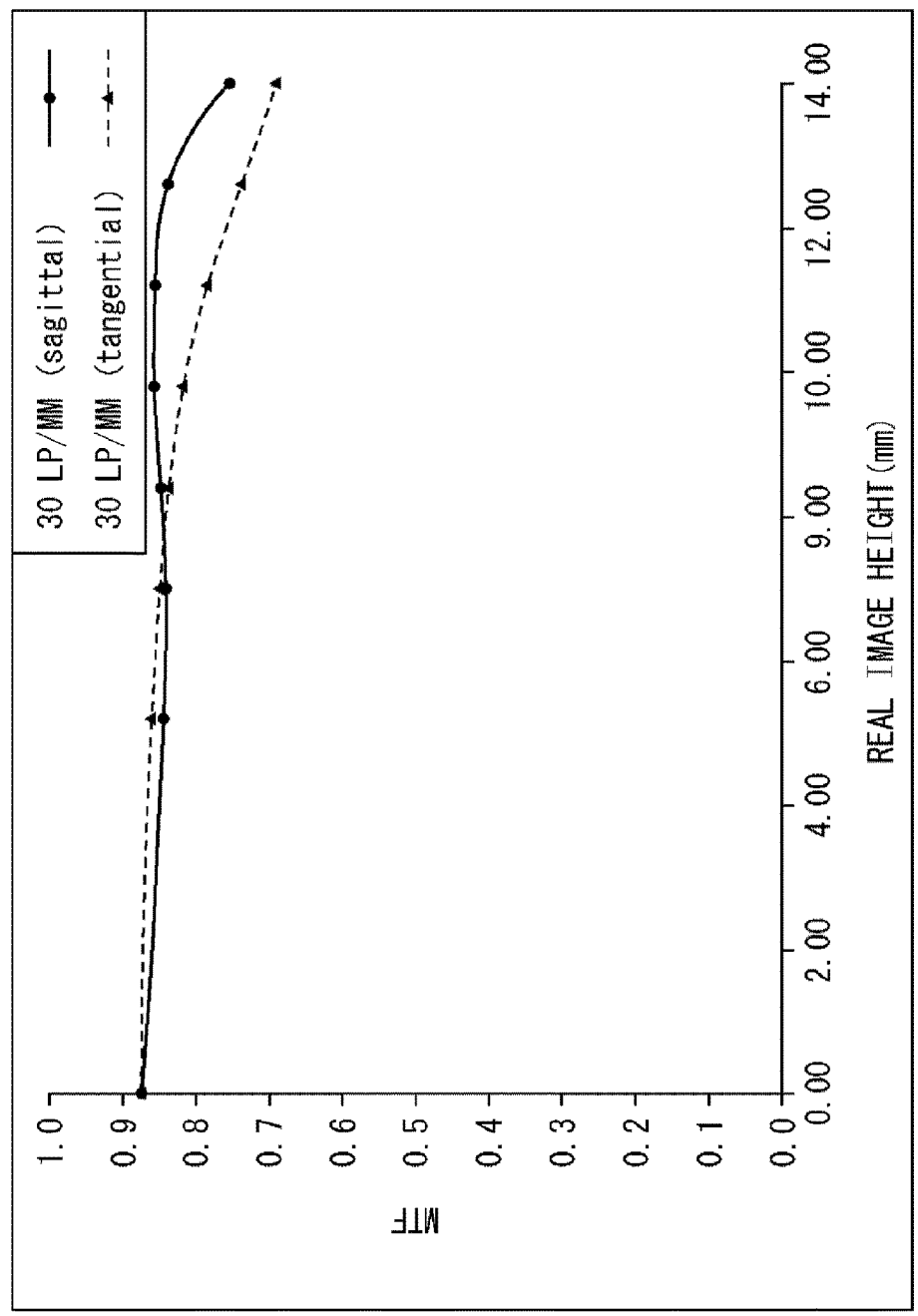
FIG. 21 shows image height dependence of MTF in Example 3.

FIG. 21 shows image height dependence of MTF in Example 3.

According to Example 3, the aberrations of spherical aberration, astigmatism and distortion were all satisfactorily corrected, as shown in FIG. 20. Though the numerical aperture is 2.74, which indicates high brightness, and though the half angle of view is as wide as 34.5 degrees, the MTF value at 30 lp/mm is 0.8 or more, which is high enough to achieve high resolution, in approximately the whole region in both the sagittal and tangential directions, as shown in FIG. 21.

Figure 22:
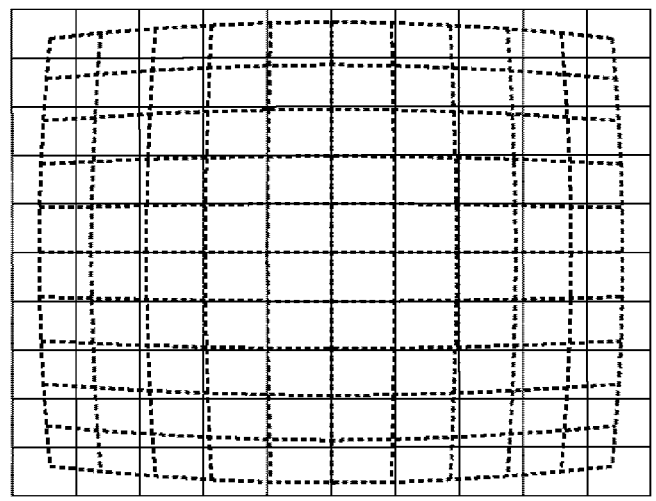
FIG. 22 shows a distortion lattice in Example 3.

Moreover, in the protruding state in Example 3, the exit pupil distance increases since the back focus BF becomes 22.8 mm while the entire optical length becomes 30.3 mm. Accordingly, the lens group 210 is caused to generate 9.30% negative (barrel) optical distortion and 3.5% negative (barrel) TV distortion as shown in FIG. 22. Then, at the time of image outputting, distortion correction is performed by signal processing, and thereby a desirable imaged image with no distortion can be obtained.

When the imaging apparatus in Example 3 is mounted on an electronic device such as a mobile phone, since the entire optical length can be reduced to approximately 7.5 mm (entire lens length) by retracting the lens group 210 in the electronic device, the thickness of the electronic device can be suppressed to approximately 12.0 mm.

[Comparison with a Triplet Configuration Lens of Related Art]

As described above, in an imaging apparatus to which the present technology is applied, the lens group 210 has the configuration of three lenses in three groups. However, a lens having such a configuration, that is, a lens having a so-called triplet configuration has been previously known.

Figure 23:
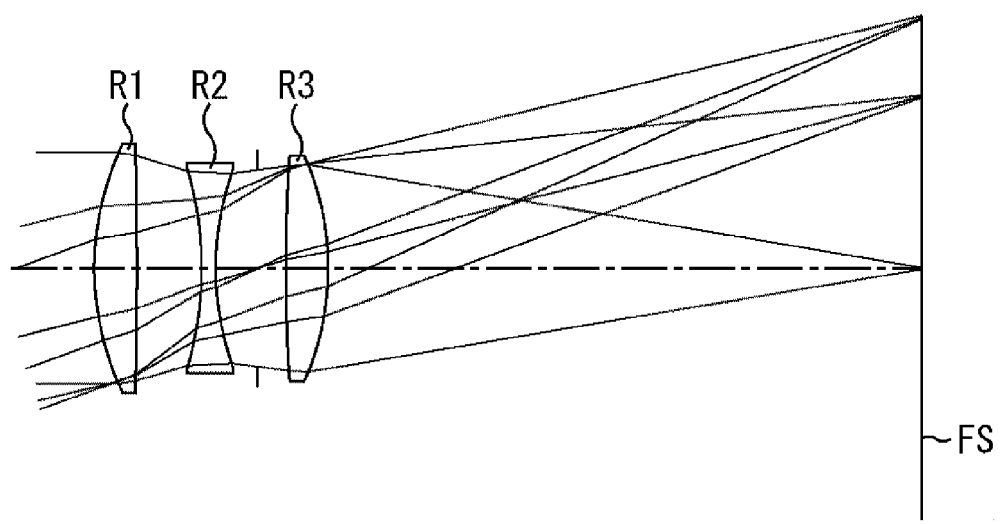
FIG. 23 shows an exemplary configuration of an imaging apparatus including a triplet configuration lens in related art.

FIG. 23 shows an exemplary configuration of an imaging apparatus including a triplet configuration lens in related art.

The imaging apparatus in FIG. 23 includes a triplet lens consisting of lens elements R1, R2 and R3, and an image sensor FS having a flat light-receiving surface.

The imaging apparatus in FIG. 23 and the imaging apparatus to which the present technology is applied are identical in that each include a triplet configuration lens, but are different in the following points.

Firstly, the lens element RE which is the lens closest to the object side, has a biconvex shape in the imaging apparatus in FIG. 23, while the lens element 211, which is the lens closest to the object side, is bent into a meniscus shape in the imaging apparatus to which the present technology is applied.

Secondly, the sum of air distances between the lens elements along the optical axis is larger than the sum of the thicknesses of the lens elements along the optical axis in the imaging apparatus in FIG. 23, while the sum of the air distances between the lens elements along the optical axis is smaller than the sum of the thicknesses of the lens elements along the optical axis in the imaging apparatus to which the present technology is applied.

Thirdly, the full angle of view can reach at most approximately 40 degrees in the imaging apparatus in FIG. 23, while, in the imaging apparatus of the present technology, the full angle of view can reach at most approximately 60 degrees, and desirable imaging performance can be achieved up to a full angle of view of approximately 70 degrees on the design basis.

Figure 24:
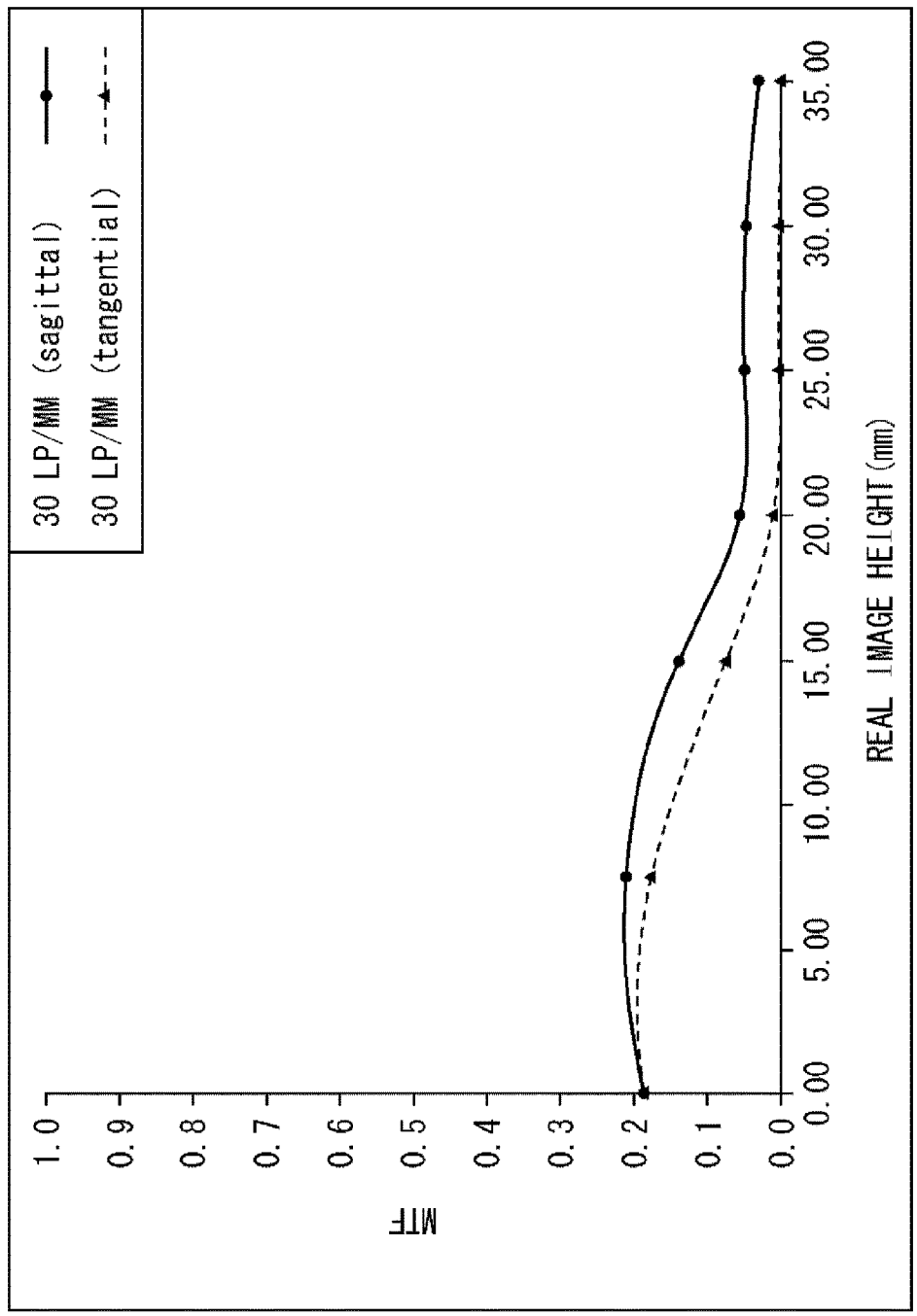
FIG. 24 shows image height dependence of MTF of the imaging apparatus in FIG. 23.

Moreover, the MTF value at 30 lp/mm is very low in approximately the whole region in both the sagittal and tangential directions, as shown in FIG. 24, in the imaging apparatus in FIG. 23, while the MTF value even at 100 lp/mm or more is 0.5 or more in a large image circle in both the sagittal and tangential directions in the imaging apparatus of the present technology, which thus can achieve high resolution.

As described above, the imaging apparatus to which the present technology is applied can provide operations and effects which could not be provided by an imaging apparatus of related art including a triplet configuration lens.

According to the result of a study on simplifying a lens group that has been made by the applicant of the present disclosure, it has been found that, in a design for an image sensor whose maximum image height is approximately 10 mm or more, providing one more lens to the object side of the lens group 210 will enhance optical performance.

Example 4

Figure 25:
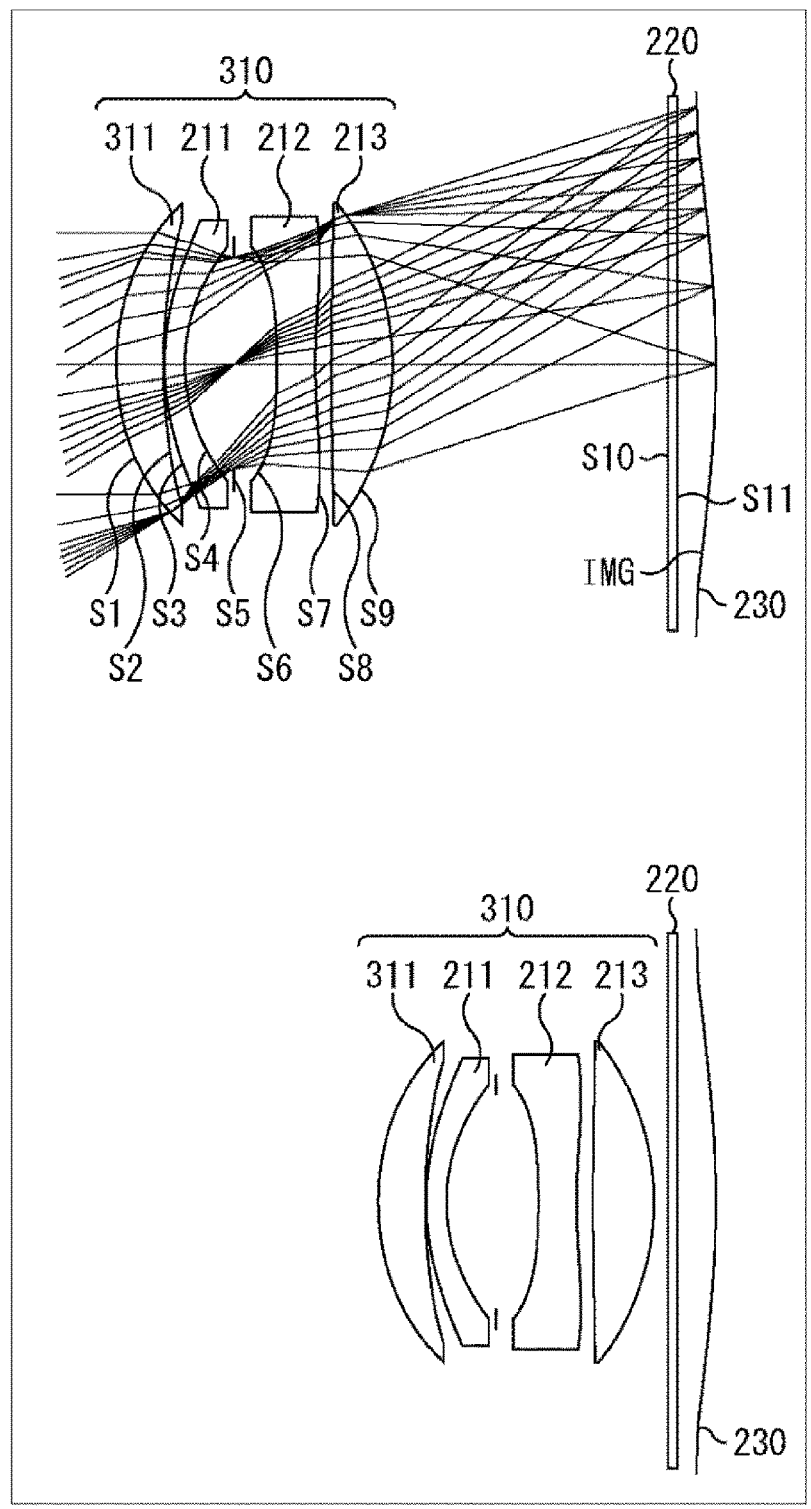
FIG. 25 shows an exemplary configuration of an imaging apparatus in Example 4.

FIG. 25 shows an exemplary configuration of an imaging apparatus for a 35 mm full-size 100-megapixel CMOS image sensor with a pixel pitch of 2.7 µm. The upper part of FIG. 25 shows the imaging apparatus in the protruding state, while the lower part of FIG. 25 shows the imaging apparatus in the retracted state.

The imaging apparatus in FIG. 25 includes a lens group 310, the cover glass 220 and the image sensor 230.

The lens group 310 includes a lens element 311, the lens element 211, a diaphragm and the lens elements 212 and 213, which are arranged in the listed order from the object side toward the light-receiving surface of the image sensor 230. The lens element 211 has a meniscus shape, so that the object-side surface thereof is convex toward an object and the light-receiving surface (image) side surface is convex toward an object, too.

As described above, the lens group 310 has a configuration in which the lens element 311 is provided to the object side of the first to third lenses constituting the lens group 210 in the imaging apparatus of the present technology. In other words, the lens group 310 consists of first to fourth lens, which are arranged in the listed order from the object side toward the light-receiving surface of the image sensor 230, and, among these first to fourth lens, the second to fourth lenses correspond to the first to third lens in the imaging apparatus of the present technology, respectively. Accordingly, the imaging apparatus in FIG. 25 including the lens group 310 having the above configuration is regarded to be the imaging apparatus to which the present technology is applied, too.

The lens element 311 has a meniscus shape having a positive power and a large Abbe number (low dispersion). The lens element 211 has a shape of weak positive power so as not to increase an incident angle on the adjacent diaphragm. Accordingly, chromatic aberration is corrected by the configuration in front of the diaphragm. The lens element 212 has a negative power and a small Abbe number (high dispersion). The lens element 213 has a strong positive power and a large Abbe number (low dispersion). Accordingly, chromatic aberration is corrected and the incident angle of a chief ray incident on the image sensor 230 is minimized by the configuration behind the diaphragm.

The light-receiving surface of the image sensor 230 has an aspherical shape curved concavely toward the lens group 210.

In FIG. 25, the surfaces of the lens element 311, the lens element 211, the diaphragm, the lens elements 212 and 213 and the cover glass 220, and the light-receiving surface of the image sensor 230 are denoted by the surface numbers of S1, S2, S3, S4, S5, S6, S7, S8, S9, S10, S11, IMG, respectively.

Table 15 shows the curvature radius R (mm), the distance d (mm), the refractive index nd and the dispersion value vd of each of the surfaces corresponding to the surface numbers in the imaging apparatus in FIG. 25.

TABLE 15

| Surface number | R | d | nd | vd |
| --- | --- | --- | --- | --- |
| S1 | 20.72 | 3.939 | 1.80 | 45.5 |
| S2 | 58.37 | 0.050 | | |
| S3 | 19.71 | 1.700 | 1.63 | 23.0 |
| S4 | 13.23 | 4.138 | | |
| S5 | INFINITY | 3.529 | | |
| S6 | −72.43 | 3.189 | 1.63 | 23.0 |
| S7 | 41.38 | 1.321 | | |
| S8 | 173.3 | 5.133 | 1.80 | 45.5 |
| S9 | −21.66 | 23.060 | | |
| S10 | INFINITY | 0.700 | 1.52 | 64.2 |
| S11 | INFINITY | 3.240 | | |
| IMG | −75.73349 | 0.000 | | |

Table 16 shows the 4th, 6th, 8th and 10th order aspherical coefficients of each of the surfaces of the imaging apparatus in FIG. 25 including aspherical surfaces, which are the surfaces S1 and S2 of the lens element 311, the surfaces S4 and S5 of the lens element 211, the surfaces S6 and S7 of the lens element 212, the surfaces S8 and S9 of the lens element 213, and the light-receiving surface IMG of the image sensor 230. In Table 16, K represents the conic constant, and A to D represent 4th, 6th, 8th and 10th order aspherical coefficients, respectively.

TABLE 16

| | | | | | |
|---|---|---|---|---|---|
| Surface S1 | K: 0.0593 | A: 0.862E−05 | B: −0.180E−07 | C: 0.438E−09 | D: −0.146E−12 |
| Surface S2 | K: 1.000 | A: 0.154E−04 | B: 0.202E−07 | C: −0.498E−09 | D: 0.128E−11 |
| Surface S3 | K: −1.000 | A: −0.824E−04 | B: 0.108E−05 | C: −0.840E−08 | D: 0.240E−10 |
| Surface S4 | K: −0.435 | A: −0.112E−03 | B: 0.125E−05 | C: −0.903E−08 | D: 0.296E−10 |
| Surface S6 | K: 1.000 | A: −0.185E−03 | B: 0.647E−06 | C: −0.238E−08 | D: −0.657E−11 |
| Surface S7 | K: −1.000 | A: −0.141E−03 | B: 0.737E−06 | C: −0.221E−08 | D: 0.235E−11 |
| Surface S8 | K: 1.000 | A: −0.667E−05 | B: −0.101E−06 | C: 0.952E−09 | D: −0.229E−11 |
| Surface S9 | K: 0.800 | A: 0.772E−05 | B: 0.627E−07 | C: −0.329E−09 | D: 0.255E−11 |
| Surface IMG | K: 5.446 | A: 0.940E−05 | B: 0.000 | C: 0.000 | D: 0.000 |

Table 17 shows the focal length f, the numerical aperture F, the half angle of view ω, the lens length H and the back focus BF of the lens group 310 of the imaging apparatus in the protruding state in the upper part of FIG. 25. In Example 4, the focal length f is set to 36.5 mm, the numerical aperture F is set to 1.60, the half angle of view ω is set to 32.0 degrees, the lens length H is set to 23.0 mm; and the back focus BF is set to 27.0 mm Thus, the entire optical length is 50.0 mm

TABLE 17

| |
|---|
| f (focal length) = 36.5 mm |
| F (numerical aperture) = 1.60 |
| ω (half angle of view) = 32.0 deg |
| H (entire lens length) = 23.0 mm |
| BF (back focus) = 27.0 mm |

Table 18 shows that the conditional expressions (1) to (4) and (6) were satisfied in Example 4.

TABLE 18

| | |
|---|---|
| Conditional expression (1) | 1.92 |
| Conditional expression (2) | −1.12 |
| Conditional expression (3) | 0.66 |
| Conditional expression (4) | −5.1 |
| Conditional expression (6) | 0.54 |

As shown in Table 18, the conditions defined by the conditional expressions (1) to (4) and (6) were satisfied in Example 4.

Figure 26:
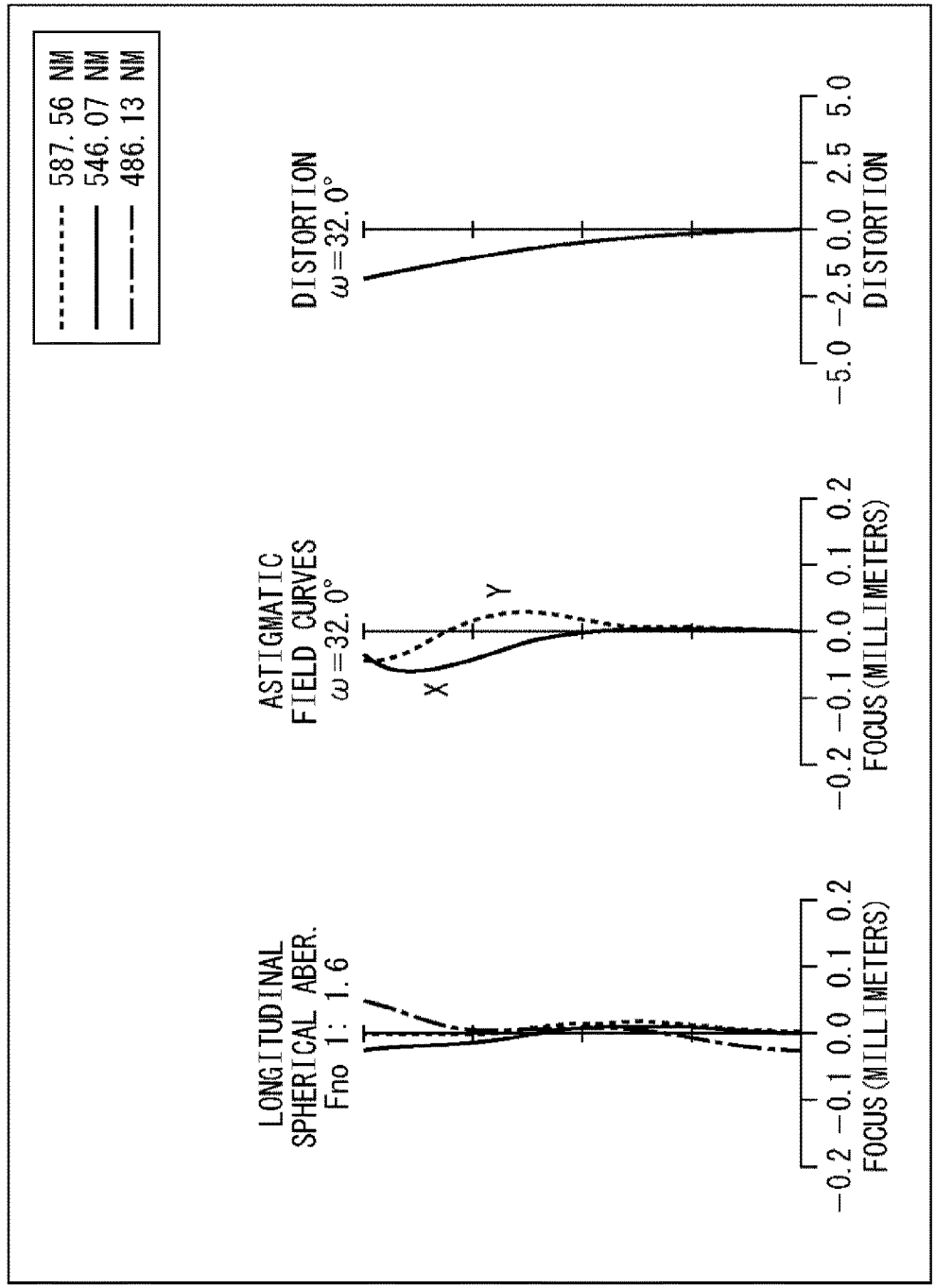
FIG. 26 is an aberration graph showing spherical aberration, astigmatism and distortion in Example 4.

FIG. 26 is an aberration graph showing spherical aberration (chromatic aberration), astigmatism and distortion in Example 4. The left part of FIG. 26 shows spherical aberration (chromatic aberration), the middle part of FIG. 26 shows astigmatism, and the right part of FIG. 26 shows distortion.

Figure 27:
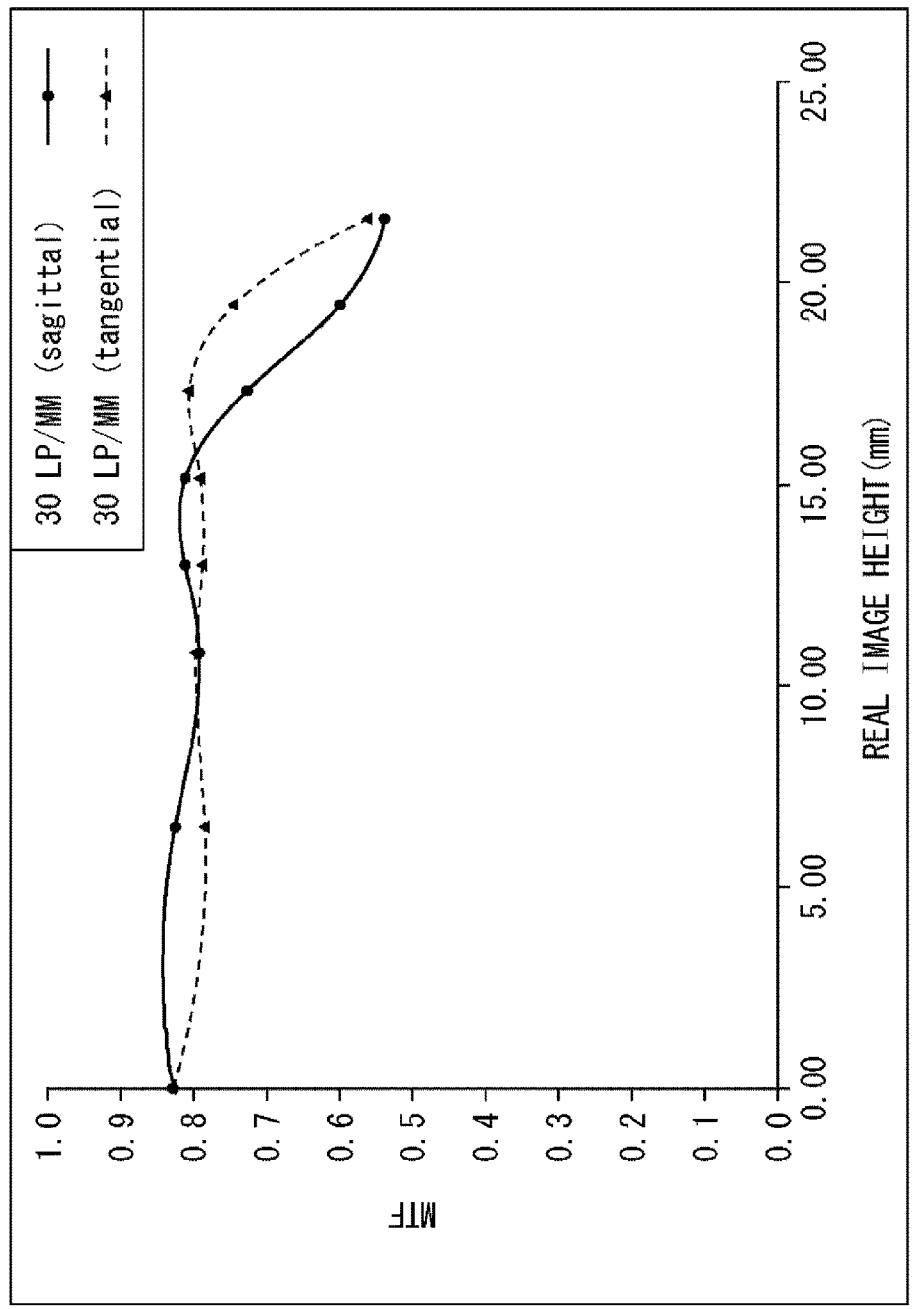
FIG. 27 shows image height dependence of MTF in Example 4.

FIG. 27 shows image height dependence of MTF in Example 4.

According to Example 4, the aberrations of spherical aberration, astigmatism and distortion were all satisfactorily corrected, as shown in FIG. 26. Though the numerical aperture is 1.60, which indicates high brightness, and though the half angle of view is as wide as 32.0 degrees, the MTF value at 30 lp/mm is high enough to achieve high resolution, that is, 0.75 or more in most of the region and 0.5 or more in the whole region, in both the sagittal and tangential directions, as shown in FIG. 27.

Figure 28:
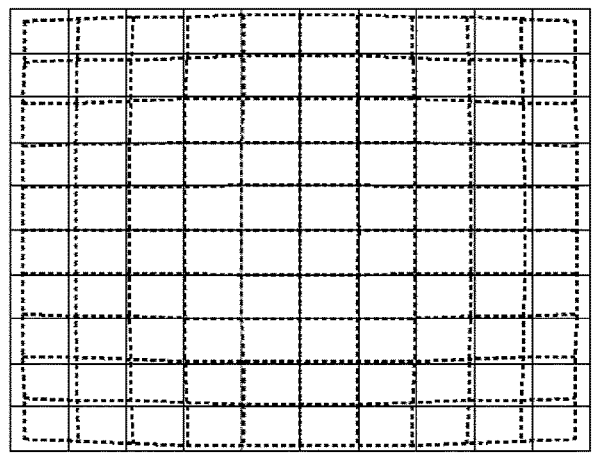
FIG. 28 shows a distortion lattice in Example 4.

Moreover, in the protruding state in Example 4, the exit pupil distance increases since the back focus BF becomes 27.0 mm while the entire optical length becomes 50.0 mm. Accordingly, the lens group 310 is caused to generate 1.83% negative (barrel) optical distortion and 1.47% negative (barrel) TV distortion as shown in FIG. 28. Since the lens group 310 has a symmetric lens configuration having two lenses in each of the front and back side of the diaphragm, distortion in Example 4 is smaller than in Example 1 to Example 3. Then, at the time of image outputting, distortion correction is performed by signal processing, and thereby a desirable imaged image with no distortion can be obtained.

Furthermore, in order to achieve the optical properties obtained by the configuration in Example 4 by using an imaging apparatus of related art, seven or more lenses are necessary and a lens group is made unretractable. Thus, when the imaging apparatus of related art is mounted on an electronic device such as a digital camera, the electronic device has a shape from which the lens portion protrudes all times. On the other hand, when the imaging apparatus in Example 4 is mounted on an electronic device, since the entire optical length can be reduced to approximately 23.0 mm (entire lens length) by retracting the lens group 310 in the electronic device, the device thickness can be suppressed.

As a configuration in which an additional lens is provided to the object side of the lens group having a configuration of three lenses in three groups, as described in Example 4, there may be employed Ernostar invented by Ludwig Bertere, a retrofocus lens by Angénieux (France), a general wide conversion or teleconversion lens, or the like.

[Exemplary Configuration of Electronic Device]

Figure 29:
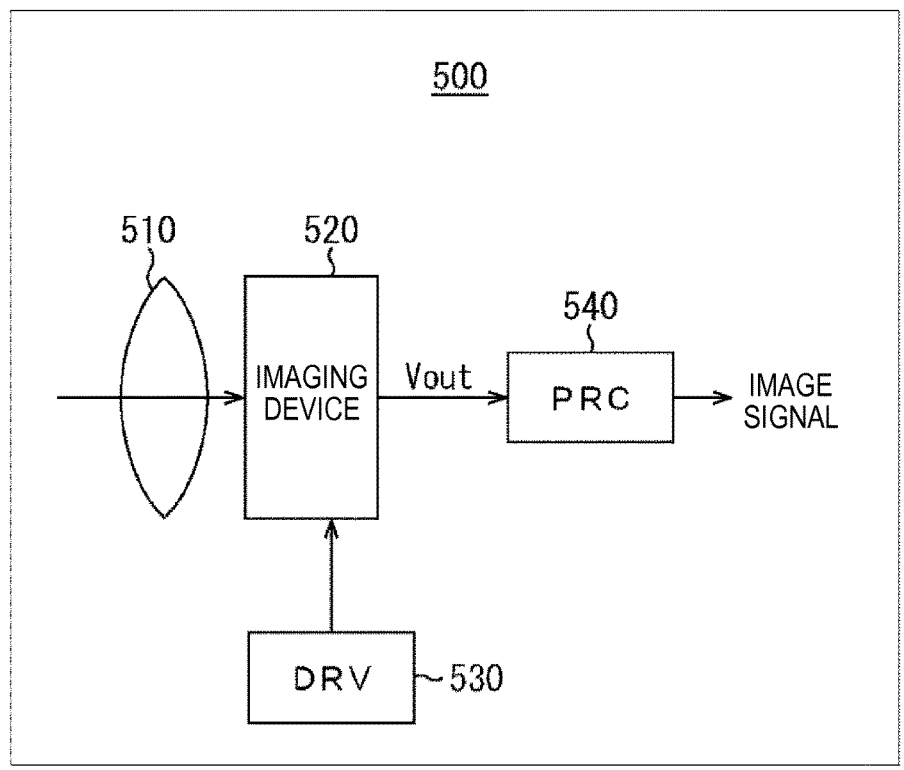
FIG. 29 is a block diagram showing an exemplary configuration of an electronic device provided with an imaging apparatus to which the present technology is applied being mounted thereon.

FIG. 29 is a block diagram showing an exemplary configuration of an electronic device provided with the imaging apparatus to which the present technology is applied being mounted thereon.

The electronic device 500 shown in FIG. 29 includes an optical system 510, being the lens group 210 or the lens group 310 in this embodiment, and an imaging device 520, being the image sensor 230 in this embodiment.

The optical system 510 introduces incident light onto an imaging surface including a pixel area of the imaging device 520 to form a photographic subject image thereon.

Additionally, the electronic device 500 further includes a drive circuit (DRV) 530 to drive the imaging 520, and a signal processing circuit (PRC) 540 to process output signals of the imaging device 520.

The drive circuit 530 drives the imaging device 520 by using various timing signals including start pulses and clock pulses to drive a circuit in the imaging device 520.

The signal processing circuit 540 performs predetermined signal processing on output signals of the imaging device 520. The image signals subjected to the processing by the signal processing circuit 540 are stored in a recording medium such as memory, for example. The image information stored in the recording medium is printed using a printer or displayed on a display device such as a display.

The present technology can achieve the following effects.
(1) Since the image sensor is curved, correction applied to the image plane of the lens can be reduced.
(2) Since realizing the curved sensor can increase the incident angle of a chief ray on the sensor, peripheral light falloff can be reduced according to the cosine-fourth law, and thus peripheral light intensity can be increased.

(3) Since upper and lower rays with respect to a chief ray are nearly symmetric in peripheral image heights, high optical properties can be easily achieved even in a peripheral region.

(4) With a lens configuration of three lenses in three groups, optical performance approximately similar to that of a lens configuration of five lenses in five groups can be achieved.

(5) The lenses have substantially the same effective diameter in the lens configuration of three lenses in three groups, which facilitates assembly and raises productivity.

(6) A long back focus can be secured in the present technology, which is thus applicable to a retractable lens.

(7) By using an image sensor having a large cell size, high resolution, high sensitivity and wide dynamic range can be achieved, though having been unachievable with an optical system of related art and a flat sensor. In addition, the retractable configuration enables provision of a camera or a camera-mounted device having a suppressed thickness.

Note that an embodiment of the present technology is not limited to the above embodiment, and various changes and modifications may be made without departing from the scope of the present technology.

Additionally, the present technology may also be configured as below.

(1)
An imaging apparatus including:
a lens group including one or more lens elements; and
an image sensor having a light-receiving surface onto which an image of an object is formed by the lens group,
wherein the light-receiving surface of the image sensor is curved concavely toward the lens group, and
wherein a distance from a lens surface closest to the light-receiving surface of the lens group to the light-receiving surface is a half or more of a distance from a lens surface closest to the object of the lens group to the light-receiving surface.

(2)
The imaging apparatus according to (1),
wherein the light-receiving surface of the image sensor has such an aspherical shape that a tangential angle between an external tangent to an edge of the light-receiving surface and a plane perpendicular to an optical axis of the lens group is smaller than the tangential angle of the light-receiving surface having a spherical shape.

(3)
The imaging apparatus according to (2),
wherein an intersection between an optical axis of the lens group and a normal line of an external tangent to the light-receiving surface at 90% image height is farther from the light-receiving surface than an intersection between the optical axis and a normal line of an external tangent to the light-receiving surface at any of 0 to 70% image heights.

(4)
The imaging apparatus according to any one of (1) to (3),
wherein the lens group generates negative optical distortion or negative TV distortion.

(5)
The imaging apparatus according to (4),
the optical distortion and the TV distortion are 1% or more.

(6) The imaging apparatus according to any one of (1) to (5),
wherein the lens group includes at least a first lens, a second lens, and a third lens, which are arranged from a side near the object toward the light-receiving surface, and
wherein a focal length f of the lens group, a focal length fg1 of the first lens, a focal length fg2 of the second lens, and a focal length fg3 of the third lens satisfy any of the following conditional expressions:

$$1 \leq |fg1/f| \leq 50$$

$$-2 \leq fg2/f \leq -0.5$$

$$0.4 \leq fg3/f \leq 1.$$

(7)
The imaging apparatus according to (6),
wherein a curvature radius Rg1S1 of a lens surface closer to the object of the first lens, and a curvature radius Rg1S2 of a lens surface closer to the light-receiving surface of the first lens satisfy either of the following conditional expressions:

$$(Rg1S1+Rg1S2)/(Rg1S2-Rg1S1) \leq -3$$

$$(Rg1S1+Rg1S2)/(Rg1S2-Rg1S1) > 10, \text{ and}$$

wherein a thickness Tg1 of the first lens along an optical axis, a thickness Tg2 of the second lens along the optical axis, a thickness Tg3 of the third lens along the optical axis, an air distance D1 along the optical axis between the first and second lenses, and an air distance D2 along the optical axis between the second and third lenses satisfy the following conditional expression:

$$(Tg1+Tg2+Tg3) > (D1+D2).$$

(8)
The imaging apparatus according to any one of (1) to (7),
wherein the lens group is held by a retractable lens barrel, and
wherein, while the lens barrel protrudes, the distance from the lens surface closest to the light-receiving surface of the lens group to the light-receiving surface is a half or more of the distance from the lens surface closest to the object of the lens group to the light-receiving surface.

(9)
An electronic device including:
an imaging apparatus including
a lens group including one or more lens elements, and
an image sensor having a light-receiving surface onto which an image of an object is formed by the lens group,
wherein the light-receiving surface of the image sensor is curved concavely toward the lens group, and
wherein a distance from a lens surface closest to the light-receiving surface of the lens group to the light-receiving surface is a half or more of a distance from a lens surface closest to the object of the lens group to the light-receiving surface.

REFERENCE SIGNS LIST 201 imaging apparatus
210 lens group
211, 212, 213 lens element
230 image sensor
240 lens barrel

The invention claimed is:
1. An imaging apparatus comprising:
a lens group including one or more lens elements; and
an image sensor having a light-receiving surface onto which an image of an object is formed by the lens group,
wherein the light-receiving surface of the image sensor is curved concavely toward the lens group, and wherein a distance from a lens surface closest to the light-receiving surface of the lens group to the light-receiving surface is a half or more of a distance from a lens surface closest to the object of the lens group to the light-receiving surface, wherein the lens group is configured to generate negative optical distortion or negative TV distortion.

2. The imaging apparatus according to claim 1,
wherein the light-receiving surface of the image sensor has such an aspherical shape that a tangential angle between an external tangent to an edge of the light-receiving surface and a plane perpendicular to an optical axis of the lens group is smaller than the tangential angle of the light-receiving surface having a spherical shape.

3. The imaging apparatus according to claim 2,
wherein an intersection between the optical axis of the lens group and a normal line of an external tangent to the light-receiving surface at 90% image height is farther from the light-receiving surface than an intersection between the optical axis and a normal line of an external tangent to the light-receiving surface at any of 0 to 70% image heights.

4. The imaging apparatus according to claim 1,
wherein the negative optical distortion and the negative TV distortion are 1% or more.

5. The imaging apparatus according to claim 1,
wherein the lens group includes at least a first lens, a second lens, and a third lens, which are arranged from a side near the object toward the light-receiving surface, and
wherein a focal length f of the lens group, a focal length fg1 of the first lens, a focal length fg2 of the second lens, and a focal length fg3 of the third lens satisfy any of the following conditional expressions:

$1 \leq |fg1/f| \leq 50$ $-2 \leq fg2/f \leq 0.5$ $0.4 \leq fg3/f \leq 1$.

6. The imaging apparatus according to claim 5,
wherein a curvature radius Rg1S1 of a lens surface closer to the object of the first lens, and a curvature radius Rg1S2 of a lens surface closer to the light-receiving surface of the first lens satisfy either of the following conditional expressions:

$(Rg1S1+Rg1S2)/(Rg1S2-Rg1S1) \leq -3$ $(Rg1S1+Rg1S2)/(Rg1S2-Rg1S1) > 10$, and wherein a thickness Tg1 of the first lens along an optical axis, a thickness Tg2 of the second lens along the optical axis, a thickness Tg3 of the third lens along the optical axis, an air distance D1 along the optical axis between the first and second lenses, and an air distance D2 along the optical axis between the second and third lenses satisfy the following conditional expression:

$(Tg1+Tg2+Tg3) > (D1+D2)$.

7. The imaging apparatus according to claim 1,
wherein the lens group is held by a retractable lens barrel, and
wherein, while the lens barrel protrudes, the distance from the lens surface closest to the light-receiving surface of the lens group to the light-receiving surface is a half or more of the distance from the lens surface closest to the object of the lens group to the light-receiving surface.

8. An electronic device comprising:
an imaging apparatus including:
a lens group including one or more lens elements; and
an image sensor having a light-receiving surface onto which an image of an object is formed by the lens group,
wherein the light-receiving surface of the image sensor is curved concavely toward the lens group, and
wherein a distance from a lens surface closest to the light-receiving surface of the lens group to the light-receiving surface is a half or more of a distance from a lens surface closest to the object of the lens group to the light-receiving surface, wherein the lens group is configured to generate negative optical distortion or negative TV distortion.

9. An imaging apparatus comprising:
a lens group including one or more lens elements; and
an image sensor having a light-receiving surface onto which an image of an object is formed by the lens group,
wherein the light-receiving surface of the image sensor is curved concavely toward the lens group, and
wherein a distance from a lens surface closest to the light-receiving surface of the lens group to the light-receiving surface is a half or more of a distance from a lens surface closest to the object of the lens group to the light-receiving surface, wherein the light-receiving surface of the image sensor has such an aspherical shape that a tangential angle between an external tangent to an edge of the light-receiving surface and a plane perpendicular to an optical axis of the lens group is smaller than the tangential angle of the light-receiving surface having a spherical shape.

* * * * *